US008210935B2

(12) United States Patent
Caputo et al.

(10) Patent No.: US 8,210,935 B2
(45) Date of Patent: Jul. 3, 2012

(54) GAMING SYSTEM, GAMING DEVICE AND METHOD OF PROVIDING COLLECTORS AND TOKENS ASSOCIATED WITH COLLECTORS

(75) Inventors: Scott A. Caputo, Santa Clara, CA (US); Mark C. Nicely, Daly City, CA (US); Gregory F. Frank, Tiburon, CA (US); Anthony J. Baerlocher, Reno, NV (US)

(73) Assignee: IGT, Reno, NV (US)

(*) Notice: Subject to any disclaimer, the term of this patent is extended or adjusted under 35 U.S.C. 154(b) by 809 days.

(21) Appl. No.: 12/269,238

(22) Filed: Nov. 12, 2008

(65) Prior Publication Data

US 2010/0120521 A1 May 13, 2010

(51) Int. Cl.
*A63F 9/24* (2006.01)
*A63F 13/00* (2006.01)
*G06F 17/00* (2006.01)
*G06F 19/00* (2011.01)

(52) U.S. Cl. .......................................... 463/26; 463/25

(58) Field of Classification Search ............... 463/25–26
See application file for complete search history.

(56) References Cited

U.S. PATENT DOCUMENTS 3,167,313 A 1/1965 Davenport et al.
4,003,578 A 1/1977 Jones
4,277,067 A 7/1981 Gettleman
4,323,242 A 4/1982 Rosenfeld
4,511,143 A 4/1985 Sankrithi
4,582,324 A 4/1986 Koza et al.
4,850,592 A 7/1989 Winter
5,083,800 A 1/1992 Lockton
5,178,395 A 1/1993 Lovell
5,333,868 A 8/1994 Goldfarb
5,393,057 A 2/1995 Marnell, II
5,566,942 A 10/1996 Elum
5,611,730 A 3/1997 Weiss
5,664,998 A 9/1997 Seelig et al.
5,769,716 A 6/1998 Saffari et al.
5,772,509 A 6/1998 Weiss
5,813,672 A 9/1998 Loud, Jr.
5,927,714 A 7/1999 Kaplan (Continued)

FOREIGN PATENT DOCUMENTS

EP 0 945 837 9/1999

(Continued)

OTHER PUBLICATIONS

Alien Adventure Advertisement, written by AC Coin & Slot, published in 2003.

(Continued)

*Primary Examiner* — Dmitry Suhol
*Assistant Examiner* — Kevin Y Kim
(74) *Attorney, Agent, or Firm* — Neal, Gerber & Eisenberg LLP

(57) ABSTRACT

Various embodiments of the disclosed gaming system, gaming device and method provide a selection game having a plurality of tokens which are assignable to a plurality of token collectors. Each of the token collectors has a designated capacity which may be the same or different for the token collectors. In one embodiment, the designated capacity of one or more token collectors is a number of tokens. In various other embodiments, the designated capacity of one or more token collectors is a total award value.

38 Claims, 33 Drawing Sheets

| | Current Award Total | Designated Capacity |
|---|---|---|
| Token Collector 1 | 45 | 45 |
| Token Collector 2 | 95 | 95 |
| Token Collector 3 | 615 | 600 |

U.S. PATENT DOCUMENTS

| | | | |
|---|---|---|---|
| 5,980,384 | A | 11/1999 | Barrie |
| 6,015,346 | A | 1/2000 | Bennett |
| 6,033,307 | A | 3/2000 | Vancura |
| 6,059,289 | A | 5/2000 | Vancura |
| 6,089,976 | A | 7/2000 | Schneider et al. |
| 6,102,798 | A | 8/2000 | Bennett |
| 6,134,556 | A | 10/2000 | Shin |
| 6,159,095 | A | 12/2000 | Frohm et al. |
| 6,174,235 | B1 | 1/2001 | Walker et al. |
| 6,190,255 | B1 | 2/2001 | Thomas et al. |
| 6,261,177 | B1 | 7/2001 | Bennett |
| 6,273,420 | B1 | 8/2001 | Brooks |
| 6,309,299 | B1 | 10/2001 | Weiss |
| 6,309,300 | B1 | 10/2001 | Glavich |
| 6,312,332 | B1 | 11/2001 | Walker et al. |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,406,369 | B1 | 6/2002 | Baerlocher et al. |
| 6,425,824 | B1 | 7/2002 | Baerlocher et al. |
| 6,439,995 | B1 | 8/2002 | Hughs-Baird et al. |
| 6,450,883 | B1 | 9/2002 | O'Halloran |
| 6,506,117 | B2 | 1/2003 | DeMar et al. |
| 6,511,375 | B1 | 1/2003 | Kaminkow |
| 6,514,141 | B1 | 2/2003 | Kaminkow et al. |
| 6,558,254 | B2 | 5/2003 | Baelocher et al. |
| 6,572,469 | B2 | 6/2003 | Klitsner et al. |
| 6,572,473 | B1 | 6/2003 | Baerlocher |
| 6,582,307 | B2 | 6/2003 | Webb |
| 6,585,591 | B1 | 7/2003 | Baerlocher et al. |
| 6,589,117 | B1 | 7/2003 | Moritome et al. |
| 6,595,854 | B2 | 7/2003 | Hughs-Baird et al. |
| 6,599,185 | B1 | 7/2003 | Kaminkow et al. |
| 6,602,135 | B1 | 8/2003 | Gerrard |
| 6,602,136 | B1 | 8/2003 | Baerlocher et al. |
| 6,602,137 | B2 | 8/2003 | Kaminkow et al. |
| 6,607,438 | B2 | 8/2003 | Baerlocher et al. |
| 6,609,974 | B2 | 8/2003 | Mead et al. |
| 6,638,164 | B2 | 10/2003 | Randall et al. |
| 6,648,754 | B2 | 11/2003 | Baerlocher et al. |
| 6,668,975 | B2 | 12/2003 | Skipper |
| 6,676,516 | B2 | 1/2004 | Baerlocher et al. |
| 6,688,975 | B2 | 2/2004 | Baerlocher et al. |
| 6,692,356 | B2 | 2/2004 | Baerlocher et al. |
| 6,722,981 | B2 | 4/2004 | Kaminkow et al. |
| 6,722,982 | B2 | 4/2004 | Kaminkow et al. |
| 6,722,983 | B2 | 4/2004 | Kaminkow et al. |
| 6,726,563 | B1 | 4/2004 | Baerlocher et al. |
| 6,733,386 | B2 | 5/2004 | Cuddy et al. |
| 6,743,096 | B2 | 6/2004 | Allendorf et al. |
| 6,749,504 | B2 | 6/2004 | Hughs-Baird |
| 6,758,747 | B2 | 7/2004 | Baerlocher |
| 6,761,632 | B2 | 7/2004 | Bansemer et al. |
| 6,769,983 | B2 | 8/2004 | Slomiany |
| 6,780,103 | B2 | 8/2004 | Bansemer et al. |
| 6,780,107 | B2 | 8/2004 | Baerlocher et al. |
| 6,780,110 | B2 | 8/2004 | Baerlocher et al. |
| 6,780,111 | B2 | 8/2004 | Cannon et al. |
| 6,783,457 | B2 | 8/2004 | Hughs-Baird et al. |
| 6,783,458 | B2 | 8/2004 | Mead et al. |
| 6,796,899 | B2 | 9/2004 | Baerlocher |
| 6,808,452 | B2 | 10/2004 | Baerlocher et al. |
| 6,811,482 | B2 | 11/2004 | Letovsky |
| 6,814,664 | B2 | 11/2004 | Baerlocher et al. |
| 6,817,943 | B2 | 11/2004 | Gerrard |
| 6,817,944 | B2 | 11/2004 | Kaminkow et al. |
| 6,837,793 | B2 | 1/2005 | McClintic |
| 6,843,721 | B2 | 1/2005 | Vancura |
| 6,843,722 | B2 | 1/2005 | Webb |
| 6,860,810 | B2 | 3/2005 | Cannon et al. |
| 6,863,606 | B1 | 3/2005 | Berg et al. |
| 6,863,607 | B2 | 3/2005 | Gerrard |
| 6,875,108 | B1 | 4/2005 | Hughs-Baird |
| 6,890,257 | B2 | 5/2005 | Baerlocher |
| 6,899,620 | B2 | 5/2005 | Kaminkow et al. |
| 6,902,478 | B2 | 6/2005 | McClintic |
| 6,913,533 | B2 | 7/2005 | Cuddy et al. |
| 6,913,535 | B2 | 7/2005 | Kaminkow et al. |
| 6,918,830 | B2 | 7/2005 | Baerlocher |
| 6,932,701 | B2 | 8/2005 | Glavich et al. |
| 6,958,013 | B2 | 10/2005 | Miereau et al. |
| 6,960,132 | B2 | 11/2005 | Baerlocher et al. |
| 6,964,608 | B1 | 11/2005 | Koza |
| 6,966,833 | B2 | 11/2005 | Kaminkow et al. |
| 6,971,954 | B2 | 12/2005 | Randall et al. |
| 6,995,751 | B2 | 2/2006 | Falvo |
| 6,996,833 | B1 | 2/2006 | Olson et al. |
| 7,037,191 | B2 | 5/2006 | Rodgers et al. |
| 7,037,192 | B2 | 5/2006 | Baerlocher et al. |
| 7,040,984 | B2 | 5/2006 | Mead |
| 7,052,392 | B2 | 5/2006 | Tessmer et al. |
| 7,056,210 | B2 | 6/2006 | Bansemer et al. |
| 7,056,214 | B2 | 6/2006 | Miereau et al. |
| 7,077,744 | B2 | 7/2006 | Cannon |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,160,186 | B2 | 1/2007 | Cuddy et al. |
| 7,160,188 | B2 | 1/2007 | Kaminkow et al. |
| 7,169,041 | B2 | 1/2007 | Tessmer et al. |
| 7,169,047 | B2 | 1/2007 | Benbrahim |
| 7,172,506 | B2 | 2/2007 | Baerlocher et al. |
| 7,175,523 | B2 | 2/2007 | Gilmore et al. |
| 7,175,524 | B2 | 2/2007 | Bansemer et al. |
| 7,182,689 | B2 | 2/2007 | Hughs-Baird et al. |
| 7,192,344 | B2 | 3/2007 | Baerlocher |
| 7,198,570 | B2 | 4/2007 | Rodgers et al. |
| 7,201,657 | B2 | 4/2007 | Baerlocher et al. |
| 7,204,259 | B2 | 4/2007 | Crisp, III |
| 7,220,180 | B2 | 5/2007 | Kaminkow et al. |
| 7,235,011 | B2 | 6/2007 | Randall et al. |
| 7,264,545 | B2 | 9/2007 | Maya et al. |
| 7,273,415 | B2 | 9/2007 | Cregan et al. |
| 7,300,348 | B2 | 11/2007 | Kaminkow et al. |
| 7,302,650 | B1 | 11/2007 | Allyn et al. |
| 7,303,469 | B2 | 12/2007 | Kaminkow et al. |
| 7,311,598 | B2 | 12/2007 | Kaminkow et al. |
| 7,311,604 | B2 | 12/2007 | Kaminkow et al. |
| 7,314,408 | B2 | 1/2008 | Cannon |
| 7,314,409 | B2 | 1/2008 | Maya et al. |
| 7,314,410 | B2 | 1/2008 | Baerlocher et al. |
| 7,316,609 | B2 | 1/2008 | Dunn et al. |
| 7,318,773 | B2 | 1/2008 | Baerlocher |
| 7,326,115 | B2 | 2/2008 | Baerlocher |
| 7,337,864 | B2 | 3/2008 | Ruck |
| 7,338,364 | B2 | 3/2008 | Baerlocher et al. |
| 7,338,367 | B2 | 3/2008 | Kaminkow et al. |
| 7,338,369 | B2 | 3/2008 | Mierau et al. |
| 7,338,371 | B2 | 3/2008 | Cheng et al. |
| 7,351,140 | B2 | 4/2008 | Wolf et al. |
| 7,351,141 | B2 | 4/2008 | Rodgers et al. |
| 7,354,344 | B2 | 4/2008 | Paulsen et al. |
| 7,357,712 | B2 | 4/2008 | Mead et al. |
| 7,361,087 | B2 | 4/2008 | Baerlocher et al. |
| 7,367,883 | B2 | 5/2008 | Gagnon |
| 7,371,166 | B1 | 5/2008 | Webb et al. |
| 7,377,849 | B2 | 5/2008 | Baerlocher et al. |
| 7,393,280 | B2 | 7/2008 | Cannon |
| 7,402,103 | B2 | 7/2008 | Baerlocher |
| 7,413,510 | B2 | 8/2008 | Schlegel et al. |
| 7,427,236 | B2 | 9/2008 | Kaminkow et al. |
| 7,435,174 | B2 | 10/2008 | Baerlocher et al. |
| 7,448,949 | B2 | 11/2008 | Kaminkow et al. |
| 7,455,588 | B2 | 11/2008 | Webb et al. |
| 7,470,184 | B2 | 12/2008 | Baerlocher et al. |
| 7,470,187 | B2 | 12/2008 | Baerlocher et al. |
| 7,470,188 | B2 | 12/2008 | Baerlocher et al. |
| 7,470,189 | B2 | 12/2008 | Baerlocher et al. |
| 7,470,190 | B2 | 12/2008 | Baerlocher et al. |
| 7,654,897 | B2 * | 2/2010 | Devaull et al. .................. 463/20 |
| 7,727,065 | B2 * | 6/2010 | Seelig et al. .................... 463/20 |
| 2002/0052232 | A1 | 5/2002 | Kaminkow |
| 2002/0077172 | A1 * | 6/2002 | Uchiyama et al. .............. 463/20 |
| 2003/0013514 | A1 | 1/2003 | Cregan et al. |
| 2003/0036422 | A1 | 2/2003 | Baerlocher et al. |
| 2003/0036424 | A1 | 2/2003 | Baerlocher |
| 2003/0036430 | A1 | 2/2003 | Cannon |

| | | | |
|---|---|---|---|
| 2003/0040358 | A1 | 2/2003 | Rothkranz et al. |
| 2003/0064773 | A1 | 4/2003 | Baerlocher et al. |
| 2003/0153378 | A1 | 8/2003 | Schlegel et al. |
| 2004/0048644 | A1 | 3/2004 | Gerrard et al. |
| 2004/0048649 | A1 | 3/2004 | Peterson et al. |
| 2004/0048673 | A1 | 3/2004 | Kaminkow |
| 2004/0053665 | A1 | 3/2004 | Baerlocher |
| 2004/0242315 | A1 | 12/2004 | Paulsen et al. |
| 2004/0248639 | A1 | 12/2004 | Slomiany |
| 2005/0020351 | A1 | 1/2005 | Baerlocher et al. |
| 2005/0033461 | A1 | 2/2005 | Gerrard et al. |
| 2005/0037840 | A1 | 2/2005 | Baerlocher |
| 2005/0054404 | A1 | 3/2005 | Baerlocher |
| 2005/0054405 | A1 | 3/2005 | Baerlocher et al. |
| 2005/0054411 | A1 | 3/2005 | Hughs-Baird et al. |
| 2005/0054415 | A1 | 3/2005 | Kaminkow et al. |
| 2005/0054416 | A1 | 3/2005 | Hostetler et al. |
| 2005/0054435 | A1 | 3/2005 | Rodgers et al. |
| 2005/0059446 | A1 | 3/2005 | Kaminkow |
| 2005/0059455 | A1 | 3/2005 | Gerrard et al. |
| 2005/0059456 | A1 | 3/2005 | Mead et al. |
| 2005/0059461 | A1 | 3/2005 | Ching et al. |
| 2005/0064928 | A1 | 3/2005 | Baerlocher et al. |
| 2005/0096123 | A1 | 5/2005 | Cregan et al. |
| 2005/0101372 | A1 | 5/2005 | Mierau et al. |
| 2005/0181860 | A1 | 8/2005 | Nguyen et al. |
| 2005/0192081 | A1 | 9/2005 | Marks et al. |
| 2005/0197180 | A1 | 9/2005 | Kaminkow et al. |
| 2006/0025196 | A1 | 2/2006 | Webb et al. |
| 2006/0030401 | A1 | 2/2006 | Mead et al. |
| 2006/0040723 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0068882 | A1 | 3/2006 | Baerlocher et al. |
| 2006/0073874 | A1 | 4/2006 | Cregan et al. |
| 2006/0073877 | A1 | 4/2006 | Rodgers et al. |
| 2006/0084500 | A1 | 4/2006 | Baerlocher et al. |
| 2006/0183528 | A1 | 8/2006 | Rodgers et al. |
| 2006/0199628 | A1 | 9/2006 | Rodgers et al. |
| 2006/0205474 | A1 | 9/2006 | Bansemer et al. |
| 2006/0217189 | A1 | 9/2006 | Walker et al. |
| 2006/0246977 | A1 | 11/2006 | Cannon |
| 2007/0015566 | A1 | 1/2007 | Baerlocher et al. |
| 2007/0032285 | A1 | 2/2007 | Wolf |
| 2007/0054732 | A1 | 3/2007 | Baerlocher |
| 2007/0054733 | A1 | 3/2007 | Baerlocher |
| 2007/0060271 | A1 | 3/2007 | Cregan et al. |
| 2007/0060300 | A1 | 3/2007 | Baerlocher |
| 2007/0077990 | A1 | 4/2007 | Cuddy et al. |
| 2007/0082725 | A1 | 4/2007 | Low et al. |
| 2007/0087809 | A1 | 4/2007 | Baerlocher |
| 2007/0105620 | A1 | 5/2007 | Cuddy et al. |
| 2007/0111783 | A1 | 5/2007 | Cuddy et al. |
| 2007/0117606 | A1 | 5/2007 | Baerlocher et al. |
| 2007/0129131 | A1 | 6/2007 | Kaminkow et al. |
| 2007/0129133 | A1 | 6/2007 | Bansemer et al. |
| 2007/0149269 | A1 | 6/2007 | Benbrahim |
| 2007/0149270 | A1 | 6/2007 | Baerlocher et al. |
| 2007/0149292 | A1 | 6/2007 | Kaminkow et al. |
| 2007/0155485 | A1 | 7/2007 | Cuddy et al. |
| 2007/0167217 | A1 | 7/2007 | Kaminkow et al. |
| 2007/0178963 | A1 | 8/2007 | Sato |
| 2007/0184894 | A1 | 8/2007 | Baerlocher |
| 2007/0197276 | A1 | 8/2007 | Sato |
| 2007/0298874 | A1 | 12/2007 | Baerlocher et al. |
| 2007/0298875 | A1 | 12/2007 | Baerlocher et al. |
| 2008/0004105 | A1 | 1/2008 | Cregan et al. |
| 2008/0020817 | A1 | 1/2008 | Kaminkow et al. |
| 2008/0020822 | A1 | 1/2008 | Cuddy et al. |
| 2008/0020823 | A1 | 1/2008 | Cuddy et al. |
| 2008/0020824 | A1 | 1/2008 | Cuddy et al. |
| 2008/0020825 | A1 | 1/2008 | Cuddy et al. |
| 2008/0020829 | A1 | 1/2008 | Baerlocher |
| 2008/0020847 | A1 | 1/2008 | Kniesteadt et al. |
| 2008/0026813 | A1 | 1/2008 | Cannon |
| 2008/0032764 | A1 | 2/2008 | Cannon |
| 2008/0051168 | A1 | 2/2008 | Kaminkow et al. |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0070702 | A1 | 3/2008 | Kaminkow et al. |
| 2008/0076514 | A1 | 3/2008 | Baerlocher et al. |
| 2008/0076515 | A1 | 3/2008 | Baerlocher et al. |
| 2008/0076517 | A1 | 3/2008 | Baerlocher et al. |
| 2008/0081690 | A1 | 4/2008 | Baerlocher et al. |
| 2008/0081691 | A1 | 4/2008 | Baerlocher et al. |
| 2008/0102920 | A1 | 5/2008 | Baerlocher |
| 2008/0108401 | A1 | 5/2008 | Baerlocher |
| 2008/0108429 | A1 | 5/2008 | Davis et al. |
| 2008/0108436 | A1 | 5/2008 | Oberberger |
| 2008/0113765 | A1 | 5/2008 | DeWaal |
| 2008/0113768 | A1 | 5/2008 | Baerlocher |
| 2008/0113771 | A1 | 5/2008 | Baerlocher et al. |
| 2008/0139274 | A1 | 6/2008 | Baerlocher |
| 2008/0139290 | A1 | 6/2008 | Kniesteadt et al. |
| 2008/0153564 | A1 | 6/2008 | Baerlocher et al. |
| 2008/0167108 | A1 | 7/2008 | Baerlocher et al. |
| 2008/0176650 | A1 | 7/2008 | Wolf et al. |
| 2008/0188278 | A1 | 8/2008 | Paulsen et al. |
| 2008/0188287 | A1 | 8/2008 | Schlegel et al. |
| 2008/0200244 | A1 | 8/2008 | Rowe et al. |
| 2008/0214272 | A1 | 9/2008 | Baerlocher et al. |
| 2008/0234034 | A1 | 9/2008 | Tessmer et al. |
| 2008/0274790 | A1 | 11/2008 | Cannon |
| 2009/0124327 | A1 | 5/2009 | Caputo et al. |
| 2010/0016065 | A1 | 1/2010 | Nicely et al. |

FOREIGN PATENT DOCUMENTS

| | | |
|---|---|---|
| EP | 1 199 689 | 4/2002 |
| EP | 1 298 607 | 4/2003 |
| EP | 1 513 115 | 3/2005 |
| EP | 1 531 434 | 5/2005 |
| EP | 1 560 179 | 8/2005 |
| GB | 2 262 642 | 6/1993 |
| WO | WO 01/74464 | 10/2001 |
| WO | WO 03/026759 | 4/2003 |
| WO | WO 03/049053 | 6/2003 |
| WO | WO 2005/002697 | 1/2005 |
| WO | WO 2005/015826 | 2/2005 |
| WO | 2006020811 A2 | 2/2006 |
| WO | WO 2007/021724 | 2/2007 |

OTHER PUBLICATIONS

Asteroids (video game), Wikipedia general game description, http://en.wikipedia.org/wiki/Asteroids_(computer_game), website printed Jan. 28, 2009.

Battleship (game), Wikipedia general game description, http://en.wikipedia.org/wiki/battleship_(game), website printed May 6, 2008.

Big Dawg Advertisement, written by Summit, published in May 2005.

Bingo (U.S.), Wikipedia general game description, http://en.wikipedia.org/wiki/Bingo_(U.S.), website printed Jan. 28, 2009.

Bowzer's Rock N' Roll Party, Article in Strictly Shots, published in Jun. 2003.

Break the Spell, Article in Strictly Slots, published in Sep. 2000.

Clue: The Great Museum Caper, Wikipedia general game description, http://en.wikipedia.org/wiki/Clue:_The_Great_Museum_Caper, website printed May 6, 2008.

Dig Dug, Wikipedia general game description, http://en.wikipedia.orq/wiki/Dig_Dug, website printed May 6, 2008.

First Person Shooter game, Wikipedia general game description, http://en.wikipedia.org/wiki/First-person_shooter, website printed Jul. 22, 2008.

Hans & Franz Advertisement, written by Bally Gaming Systems, published in 2003.

Hexbreaker Video Slots Advertisement, written by IGT, published in 2003.

Hollywood Squares—Premier Night, Article in Strictly Slots, published in Jun. 2005.

Hollywood Squares—Tour of Stars Advertisement, published in Oct. 2003.

I Love Lucy—Chocolate Factory, Article in Strictly Shots, published May 2003.

Its My Party Advertisement, written by IGT, published in 2004.
Jack and the Beanstalk Advertisement, written by A.C. Coin and Slot, published Jul. 2002.
Jackpot Jewels Advertisement, written by IGT, published in 2004.
Little Green Men Jr., Article in Strictly Slots, published in Feb. 2003.
Men in Black, Article in Strictly Slots, published in Apr. 2004.
Minesweeper (computer game), Wikipedia general game description, http://en.wikipedia.org/wiki/Minesweeper_(computer_game), website printed Jan. 29, 2008.
Money Mad Martians Advertisement, written by IGT, published in 2002.
A Salute to Game Shows, Showcase Showdowns, http://shuminweb.com/game-shows/shows/price-is-right/showcase-showdowns.html, website printed Mar. 16, 2001.
The Price is Right, Cliffhangers Advertisement, written by IGT, published 2001.
Space Invaders, Wikipedia general game description, http://en.wikipedia.org/wiki/Space_invaders, website printed Jan. 28, 2009.
Tetris, Wikipedia general game description, http://en.wikipedia.org/wiki/Tetris, website printed Jan. 28, 2009.
Triple Double dollars Video Slots Advertisement, written by IGT, published 2004.
Xandu Advertisement, written by Atronic Casino Tech., Ltd., published in 2003.

* cited by examiner

16

16

16

GAMING SYSTEM, GAMING DEVICE AND METHOD OF PROVIDING COLLECTORS AND TOKENS ASSOCIATED WITH COLLECTORS

BACKGROUND

Player selection games are popular and well-known in the gaming industry. In certain known selection games, a gaming device displays a plurality of positions to a player, some of which are associated with awards and at least one of which is associated with a terminating symbol. In these types of games, typically a gaming device enables the player to select positions until the player selects a position associated with a terminator, at which time the gaming device provides the player with any earned awards and the game ends.

Other known selection games in the gaming industry are matching games. These games generally require a player to select displayed positions until the player selects two or more matching symbols, at which time the player may be provided with an award.

Although games in which a player picks positions until selecting a position associated with a terminating symbol are exciting for players, such games do not enable the use of player skill or perceived skill as no strategy is typically involved in such games.

Accordingly, a need exists for gaming systems, gaming devices and methods providing new and exciting player selection games.

SUMMARY

Various embodiments of the disclosed gaming system, gaming device and method provide a selection game having a plurality of tokens which are assignable to a plurality of token collectors. Each of the token collectors has a designated capacity which may be the same or different for the token collectors. In one embodiment, the designated capacity of one or more token collectors is a number of tokens. In various other embodiments, the designated capacity of one or more token collectors is a total award value.

In the primary embodiment, the gaming system does not display information relating to the designated capacity of each of the token collectors until at least one of the token collectors reaches its respective designated capacity. In one embodiment, the gaming system displays the tokens and for each displayed token, enables a player to assign the displayed token to one of the token collectors. In various other embodiments, the gaming system randomly assigns one or more tokens to a respective token collector. When one of the token collectors reaches its designated capacity (via assignment of tokens to the token collector), the gaming system provides the player with an award. In one embodiment, the award is associated with the tokens and is determined by combining the award values associated with tokens assigned to the token collector which has first reached its designated capacity. In another embodiment, the award is associated with the token collector which has reached its designated capacity and the award is independent of the tokens.

Since the player does not know the designated capacity of the token collectors, the player may employ various strategies to attempt to maximize the award the player receives. For example, the player may try to cause a token collector with a largest capacity to reach its designated capacity prior to the other token collectors. In another example, an aggressive player could assign tokens associated with high award values to one token collector, while assigning tokens associated with relatively lower award values to another token collector. The risk in such a strategy is the chance of causing the token collector in which the player is placing relatively lower award values to reach its designated capacity first. A more risk-averse player may employ a strategy including assigning tokens to token collectors in a manner such that tokens associated with high award values and tokens associated with relatively low award values are equally distributed amongst the token collectors.

The present disclosure also contemplates multiple ways in which the gaming system and gaming device can provide the selection game. The selection game in different embodiments is provided as a primary or base game or as a secondary or bonus game. The selection game in alternative embodiments is provided in a single-player format or in a multi-player format. The selection game in further alternative embodiments is provided as a type of extended or persistence game which extends over multiple plays or activations of a primary game or a secondary game. As a secondary or bonus game, the selection game can award direct prizes, progressive jackpot awards, additional free spins in a subsequent free spins bonus, additional award multipliers in a subsequent free spins bonus, or any combination thereof.

Additional features and advantages are described herein, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
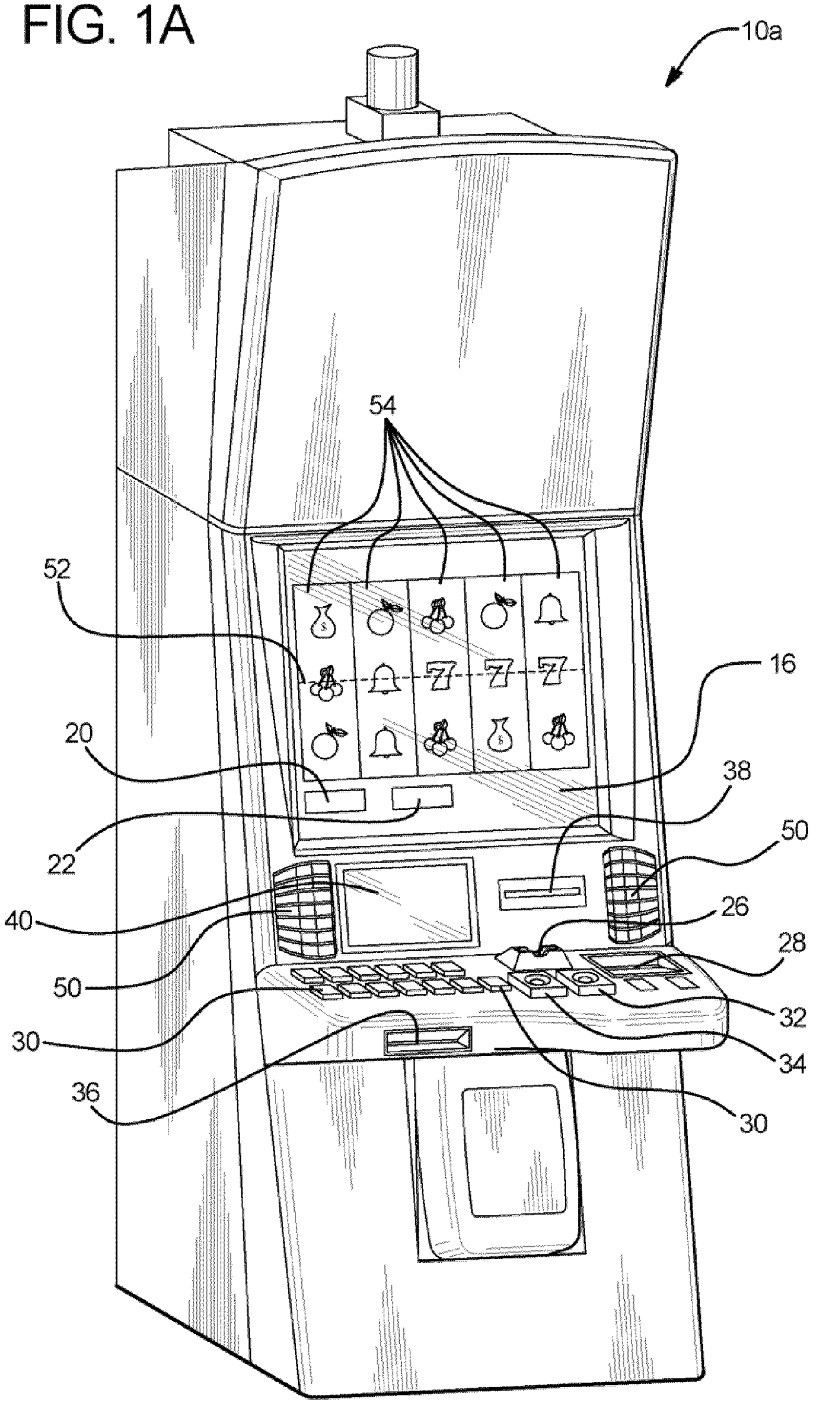
FIG. 1A is a front perspective view of one embodiment of the gaming device of the present invention.
Figure 1B:
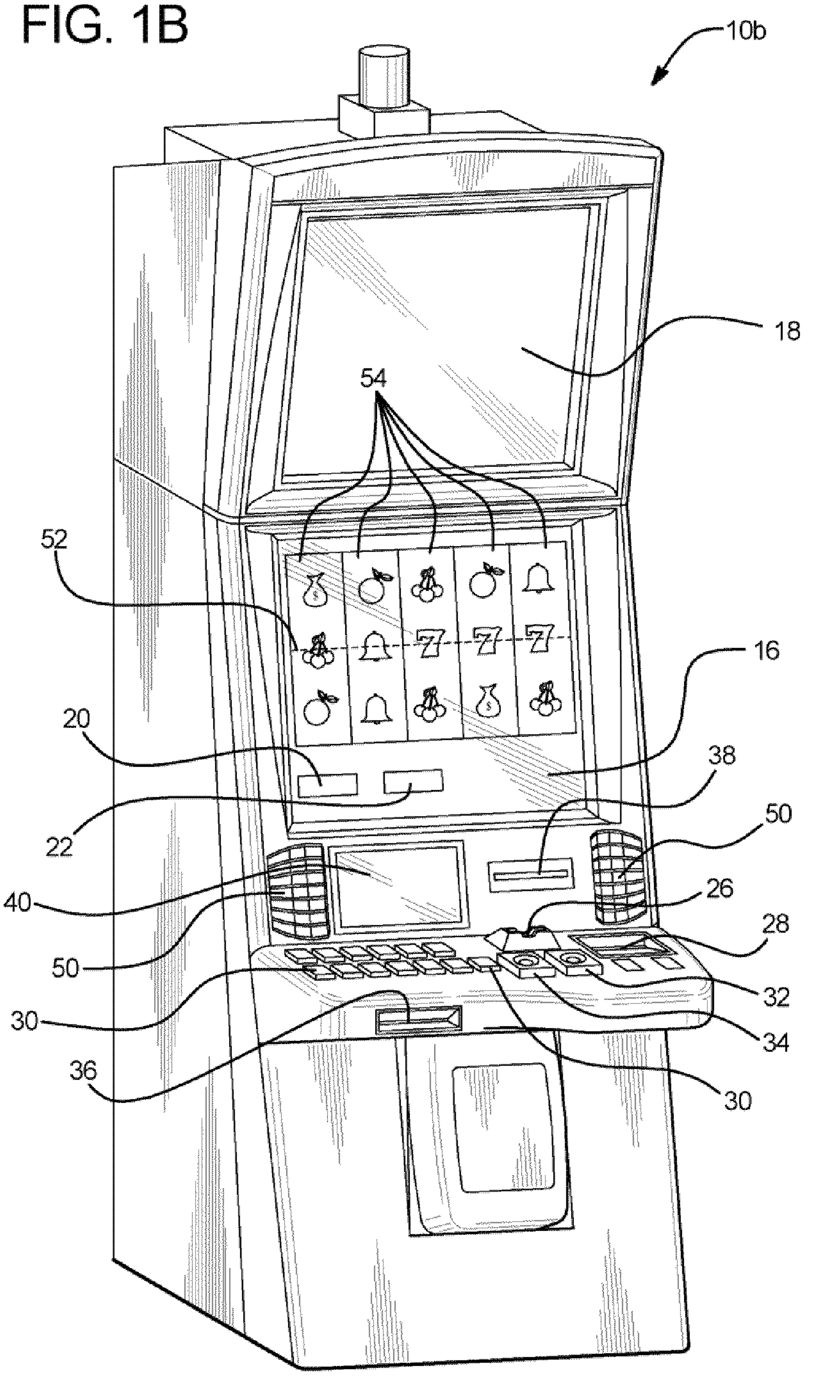
FIG. 1B is a front perspective view of another embodiment of the gaming device of the present invention.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
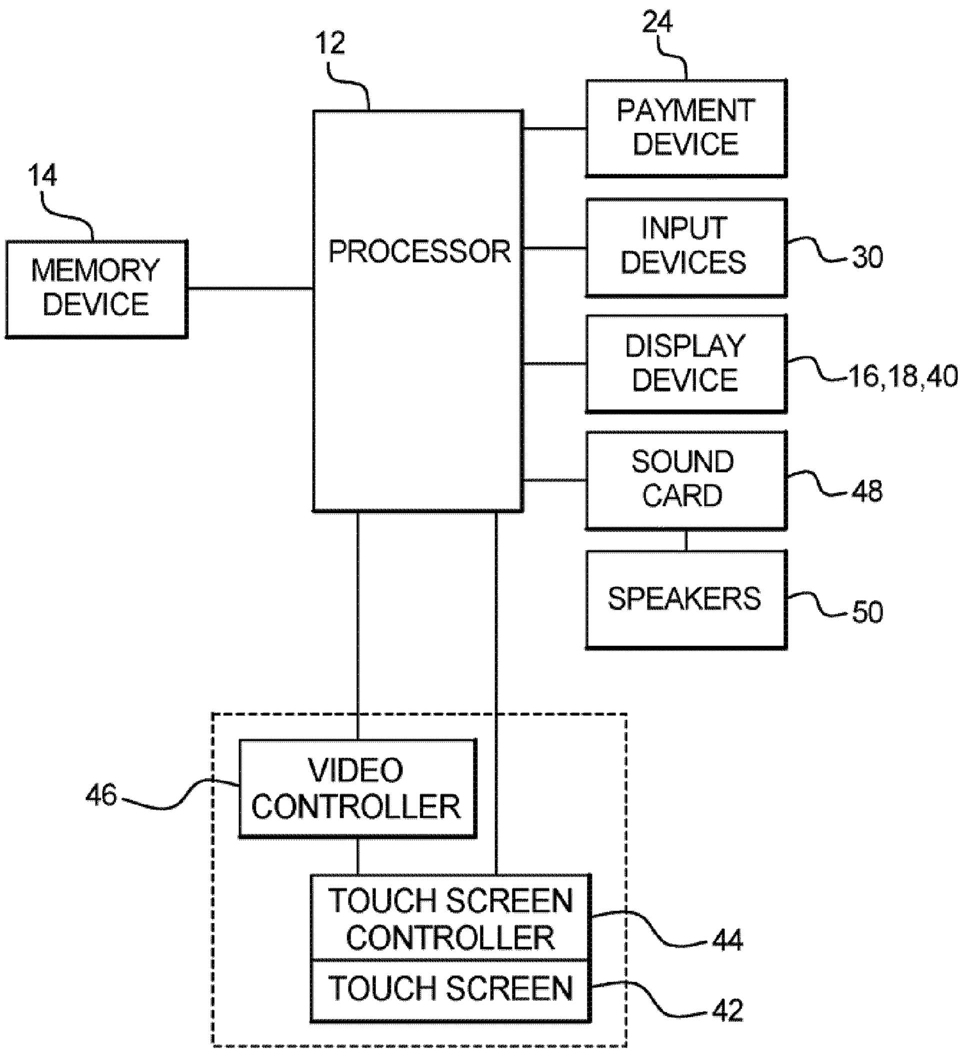
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable, memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52 and the selection game disclosed herein may be a bonus or secondary game. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

It should be appreciated that in various other embodiments, the selection game disclosed herein may be a base or primary game and the slot game discussed above may be a bonus or secondary game as discussed below.

In one embodiment, a base or primary game may be a poker game wherein the gaming device enables the player to play a conventional game of video draw poker and initially deals five cards all face up from a virtual deck of fifty-two cards and the selection game disclosed herein may be a bonus or secondary game. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

It should be appreciated that in various other embodiments, the selection game disclosed herein may be a base or primary game and the poker game discussed above may be a bonus or secondary game as discussed below.

In another embodiment, the base or primary game may be a multi-hand version of video poker and the selection game disclosed herein may be a secondary or bonus game. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

It should be appreciated that in various other embodiments, the selection game disclosed herein may be a base or primary game and the multi-hand video poker game discussed above may be a bonus or secondary game as discussed below.

In one embodiment, a base or primary game may be a keno game wherein the gaming device displays a plurality of selectable indicia or numbers on at least one of the display devices and the selection game disclosed herein may be a bonus or secondary game. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

It should be appreciated that in various other embodiments, the selection game disclosed herein may be a base or primary game and the keno game discussed above may be a bonus or secondary game as discussed below.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
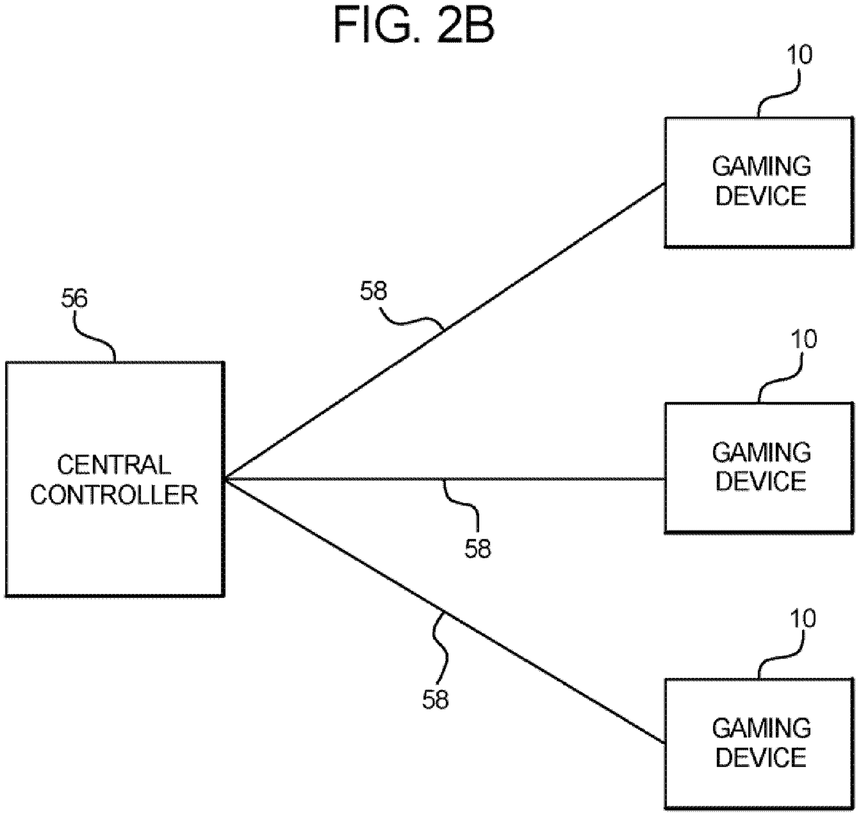
FIG. 2B is a schematic diagram of the central controller in communication with a plurality of gaming devices in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified players gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on players wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Selection Game Example Embodiments

Various embodiments of the disclosed gaming system, gaming device and method provide a selection game having a plurality of tokens which are assignable to a plurality of token collectors. Each of the token collectors has a designated token capacity. In various embodiments, the gaming system does not display the amount or other information relating to the designated capacity of each of the token collectors until at least one of the token collectors reaches its respective designated capacity.

Single Player Embodiment

Figure 3A:
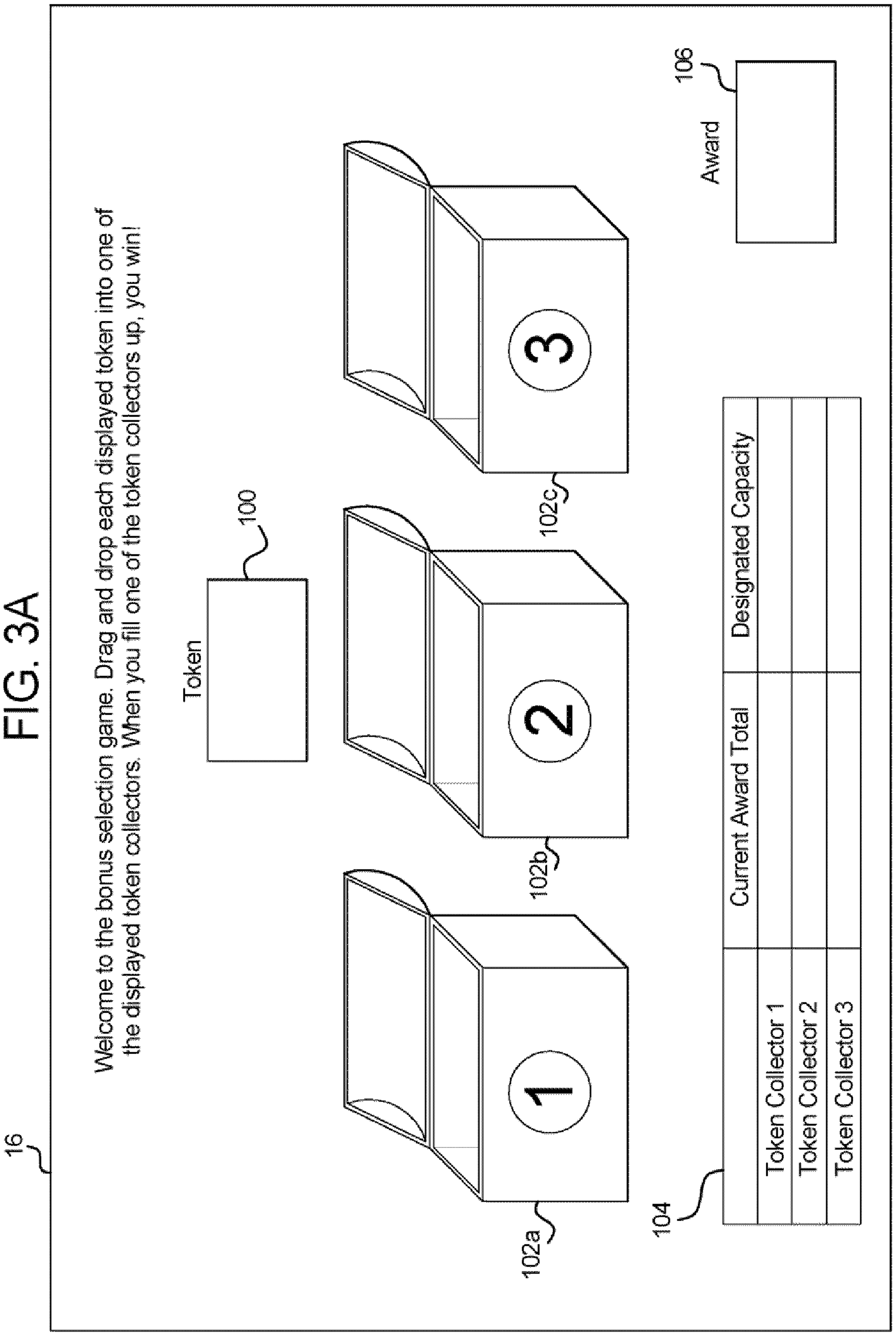
FIGS. 3A, 3B, 3C, 3D, 3E, 3F, 3G, 3H, 3I, 3J, 3K and 3L include front views of a gaming device display enabling a play of a game by a single player in accordance with one embodiment of the gaming system disclosed herein.

Referring now specifically to FIG. 3A, in one embodiment, the selection game is a bonus game initiated by the gaming system upon the occurrence of a designated triggering event. Upon the occurrence of the designated triggering event, the gaming device displays three token collectors 102*a*, 102*b*, and 102*c*, the designated capacities of which are not displayed and are unknown to the player, as illustrated in FIG. 3A. The gaming system displays instructions prompting the player to drag and drop each token displayed in the token display 100 into one of the plurality of displayed token collectors, 102*a*, 102*b*, and 102*c*. In this embodiment, preferably the display 16 includes a touch screen.

Figure 3B:
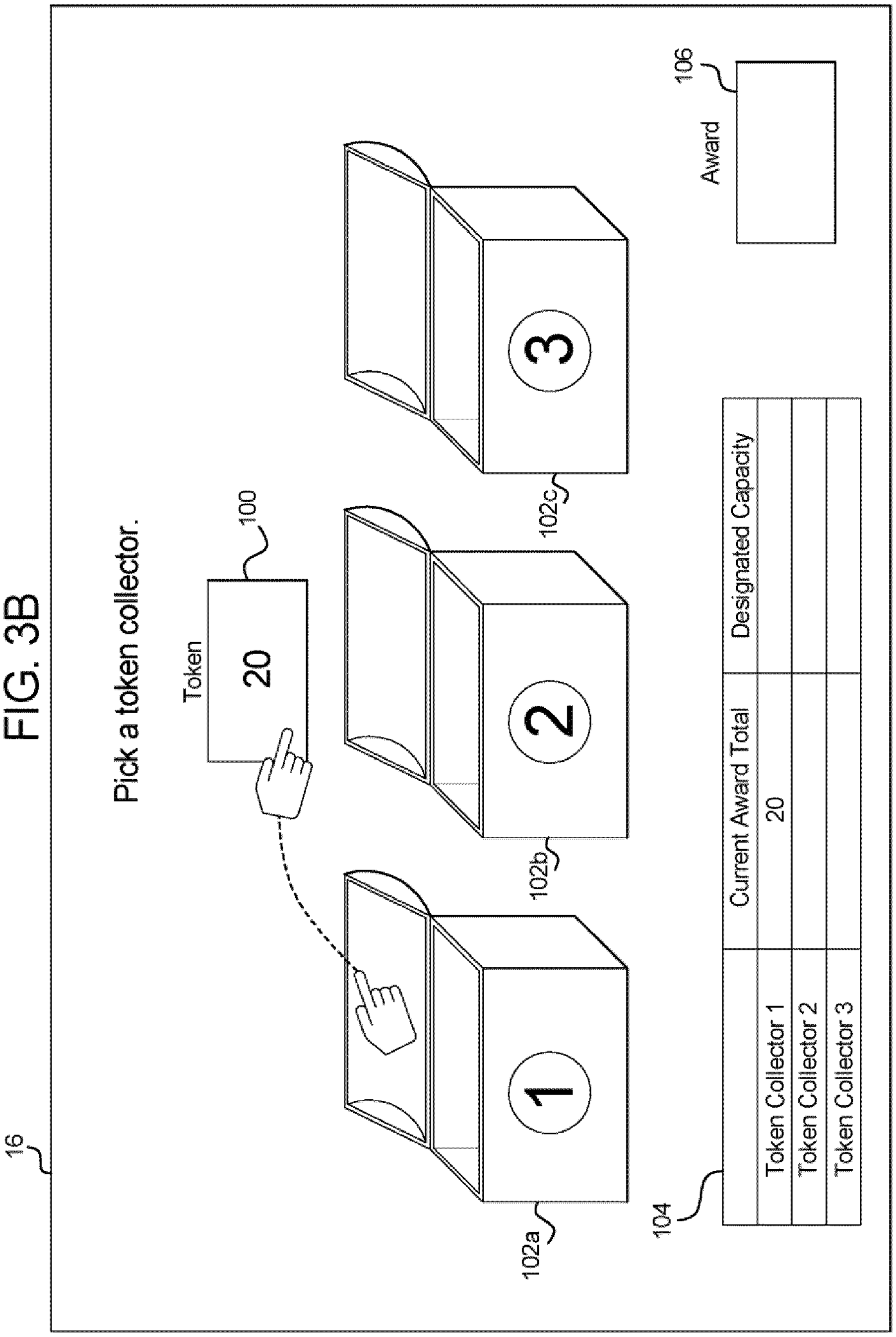

Referring now to FIG. 3B, the gaming system displays a token in token display 100 including an award of 20 credits and instructs the player to pick a token collector. The player touches the display 16 and drags and drops the token at token collector one 102*a*, as illustrated in FIG. 3B. Table 104 then reflects that the current award total of token collector one 102*a* is 20 credits. It should be appreciated that in various other embodiments, the gaming device enables a player to select a token collector using any suitable input device. As illustrated in table 104, the gaming system does not yet display the designated token capacities of each of the token collectors 102*a*, 102*b*, and 102*c*.

Figure 3C:
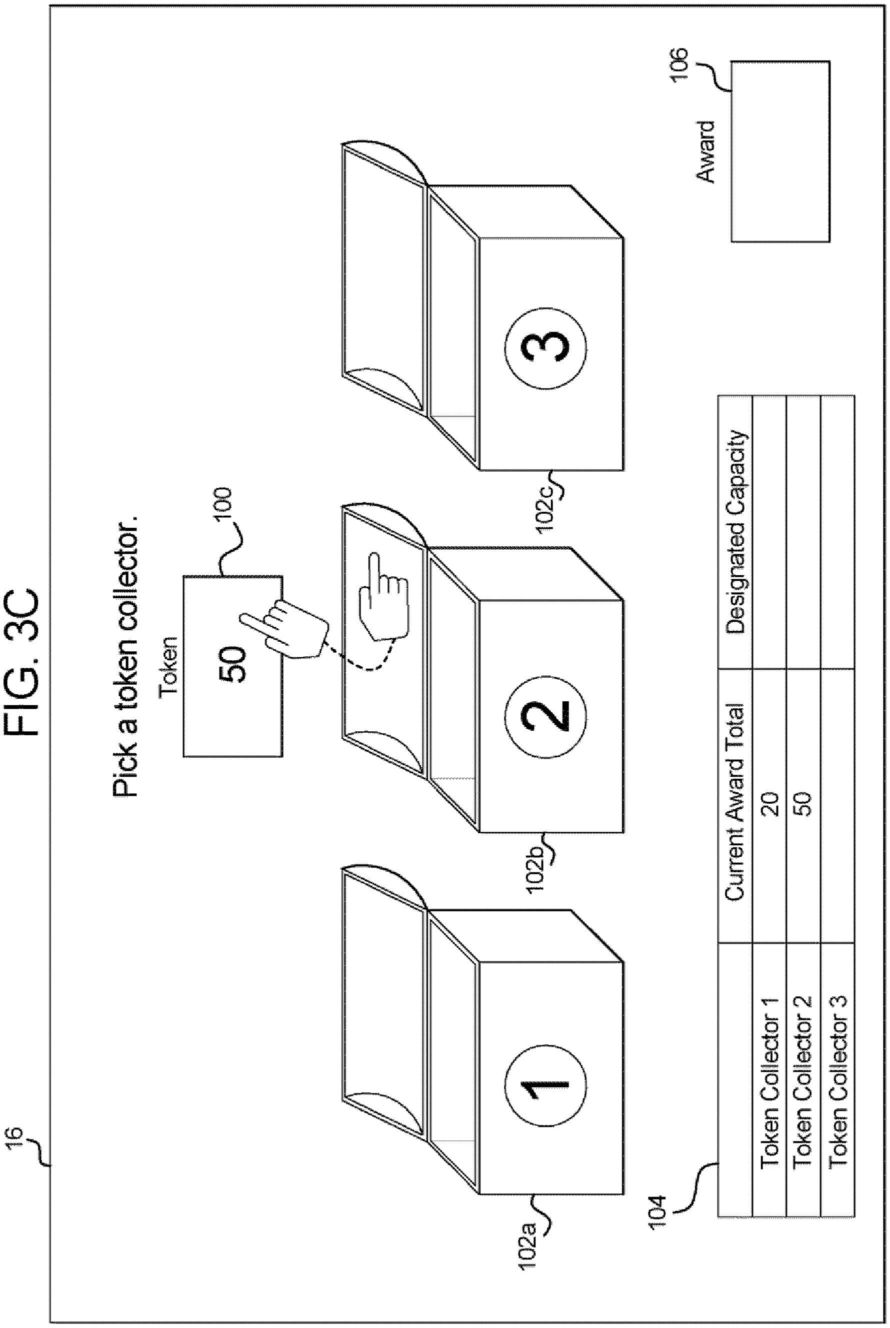

Referring to FIG. 3C, the gaming system displays a token in token display 100 including an award of 50 credits and instructs the player to pick a token collector. The player touches the display 16 and drags and drops the token at token collector two 102*b*, as illustrated in FIG. 3C. Table 104 then reflects that the current award total of token collector two 102*b* is 50 credits. For this selection, the player employed a strategy of spreading the first two tokens displayed, which were of relatively small credit amounts, among to two different token collectors 102*a* and 102*b*. This strategy minimized the risk associated with overfilling one of these two token collectors too early if one of them happens to have a relatively small designated capacity which would end the game early and may limit the awards provided to the player.

Figure 3D:
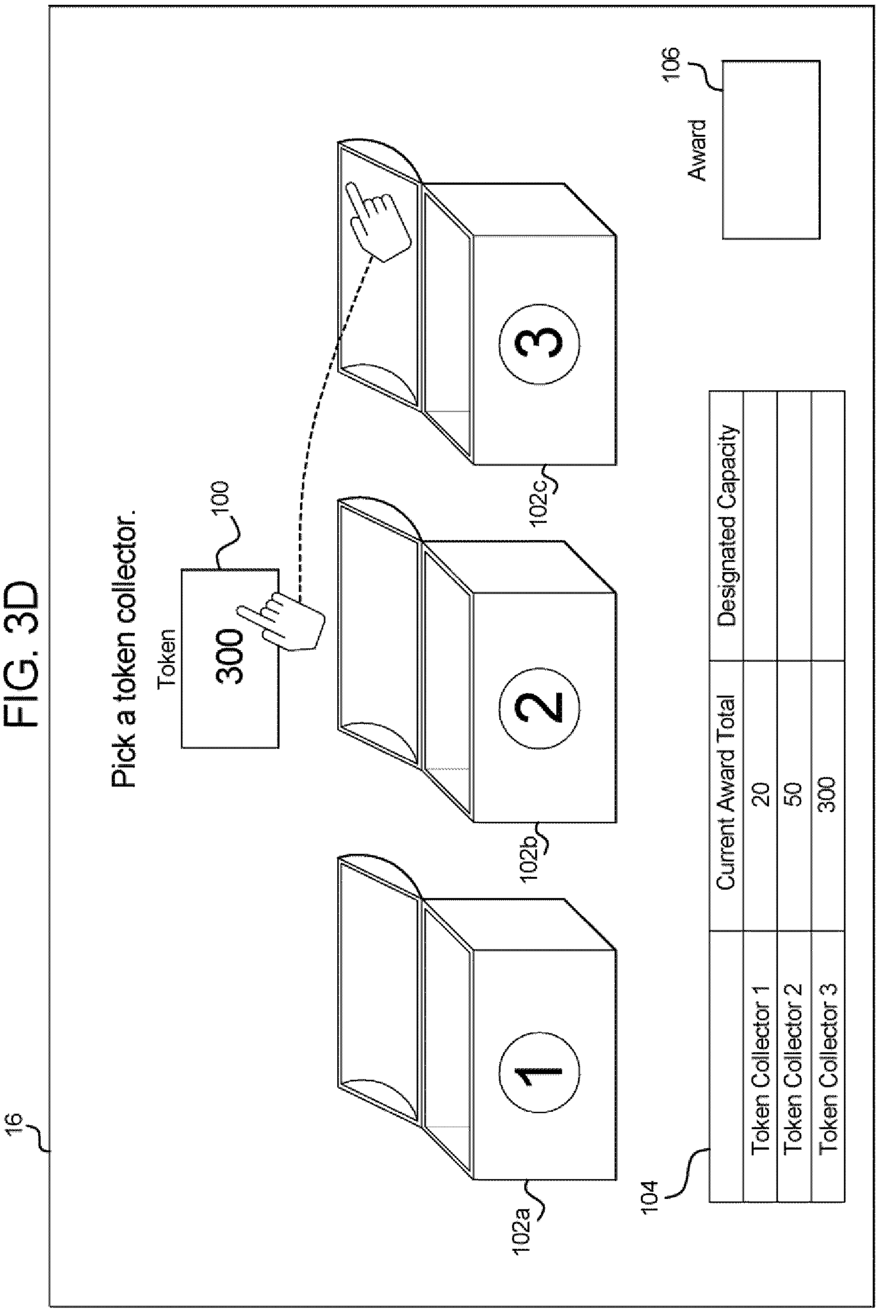

Referring to FIG. 3D, the gaming system displays a token in token display 100 including an award of 300 credits and instructs the player to pick a token collector. The player touches the display 16 and drags and drops the token at token collector three 102*c*, as illustrated in FIG. 3D. Table 104 then reflects that the current award total of token collector three 102*c* is 300 credits. For this selection, the player employed a strategy of placing relatively larger awards in token collector three 102*c*, as opposed to token collectors one 102*a* and two 102*b*, in which the player had placed relatively smaller awards. In this example, the player is employing such a strategy with the hope that token collector three 102*c* has a large designated capacity and will reach its designated capacity before token collectors one 102*a* and two 102*b*, providing the player with a larger award.

Figure 3E:
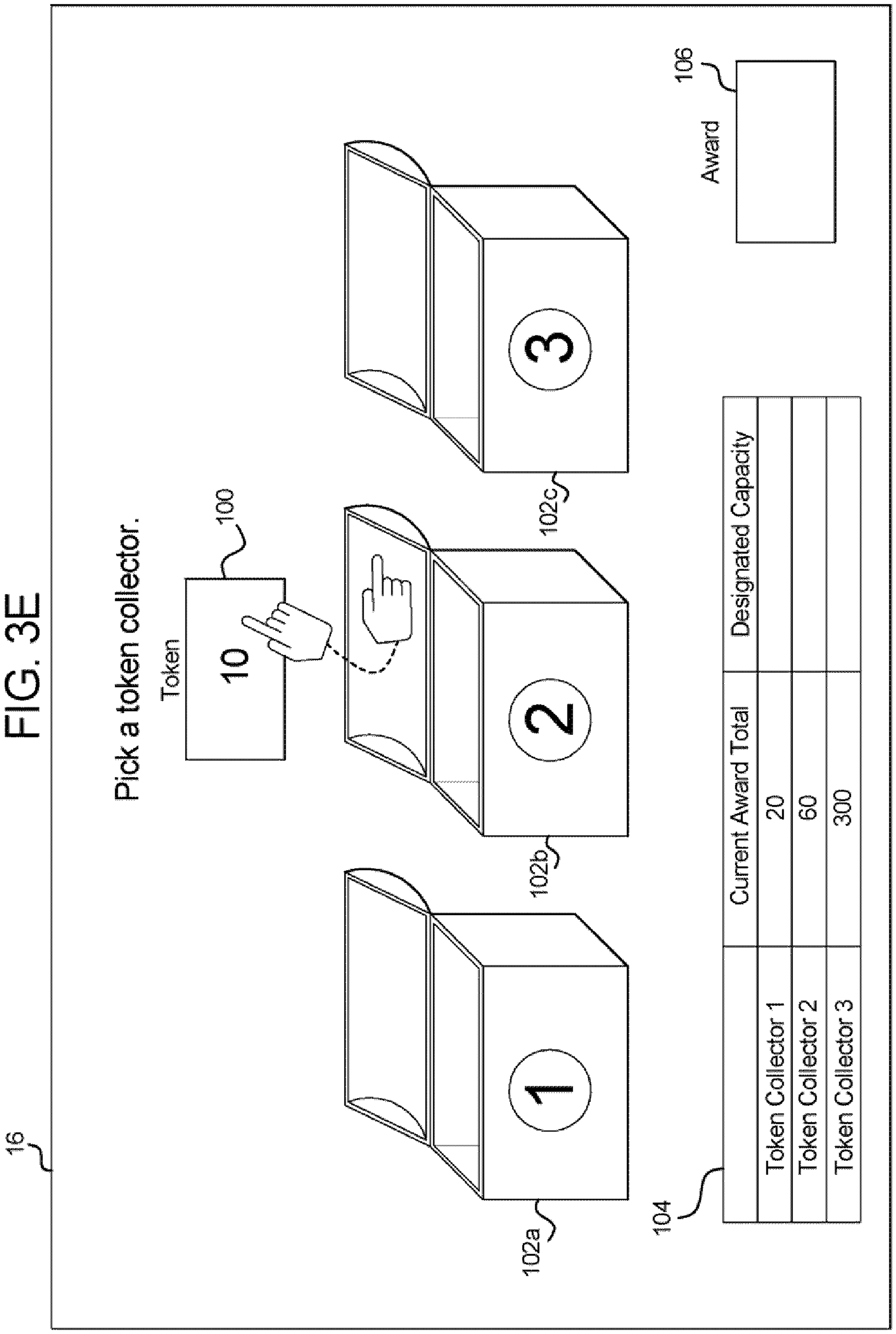

Referring to FIG. 3E, the gaming system displays a token in token display 100 including an award of 10 credits and instructs the player to pick a token collector. The player touches the display 16 and drags and drops the token at token collector two 102*b*, as illustrated in FIG. 3E. Table 104 then reflects that the current award total of token collector two 102*b* is 60 credits. For this selection, the player continues a strategy of alternating the placement of relatively smaller awards between token collector one 102*a* and token collector two 102*b*.

Figure 3F:
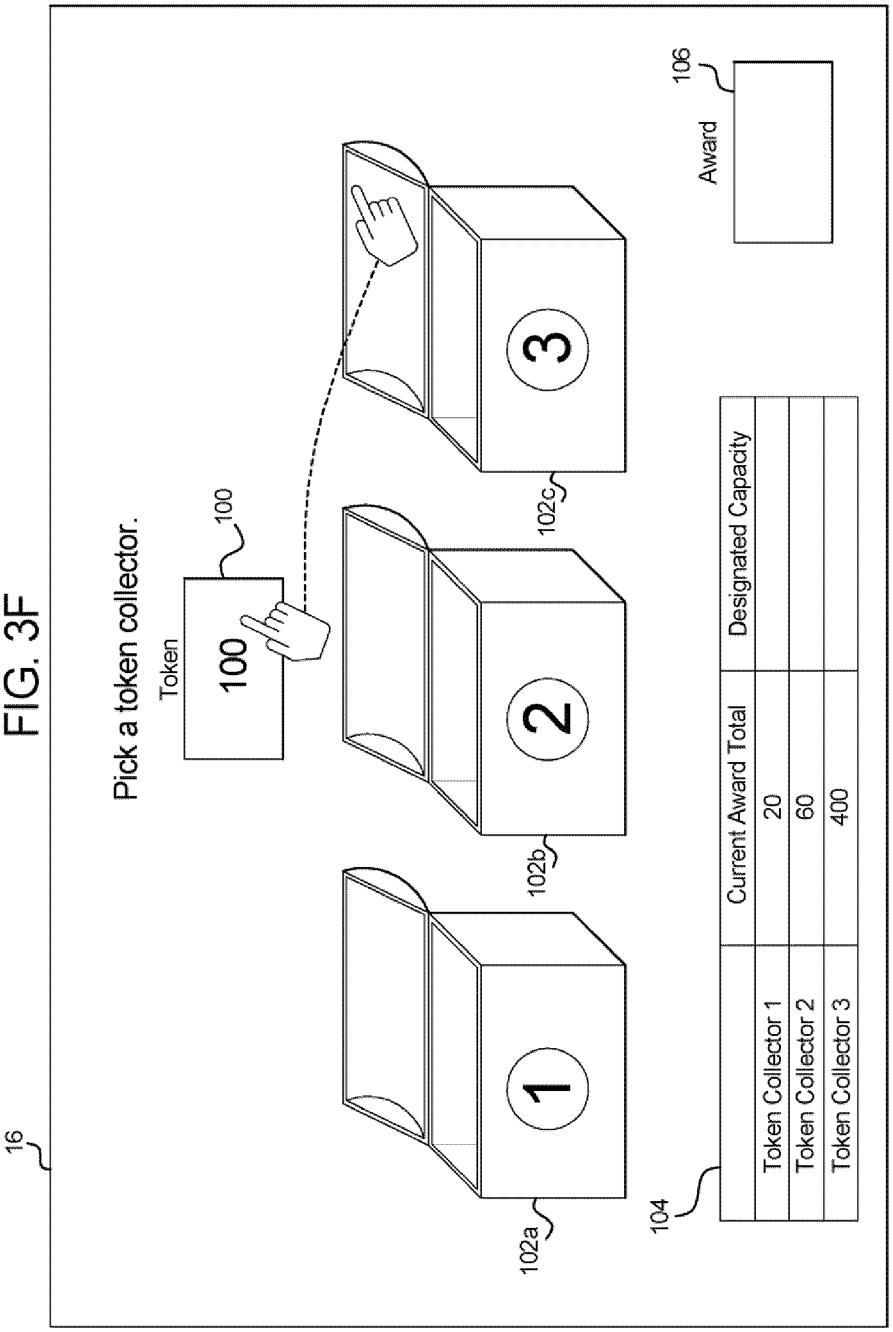

Referring to FIG. 3F, the gaming system displays a token in token display 100 including an award of 100 credits and instructs the player to pick a token collector. The player touches the display 16 and drags and drops the token at token collector three 102*c*, as illustrated in FIG. 3F. Table 104 then reflects that the current award total of token collector three 102*c* is 400 credits. For this selection, the player continues a strategy of placing tokens including relatively larger awards in token collector three 102*c*.

Figure 3G:
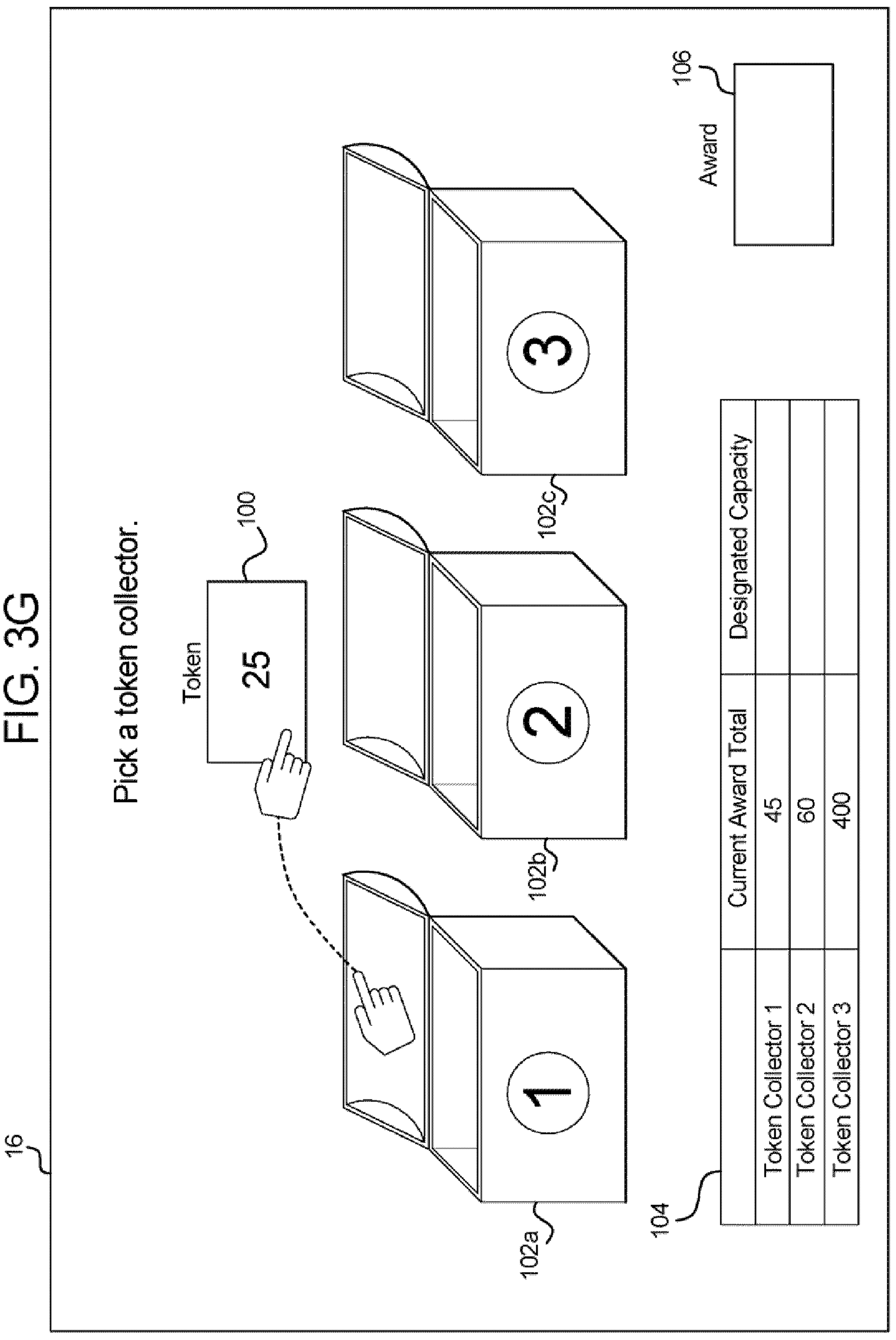

Referring to FIG. 3G, the gaming system displays a token in token display 100 including an award of 25 credits and instructs the player to pick a token collector. The player touches the display 16 and drags and drops the token at token collector one 102*a*, as illustrated in FIG. 3G. Table 104 then reflects that the current award total of token collector three 102*a* is 45 credits. For this selection, the player continues a strategy of alternating the placement of relatively smaller awards between token collector one 102*a* and token collector two 102*b*.

Figure 3H:
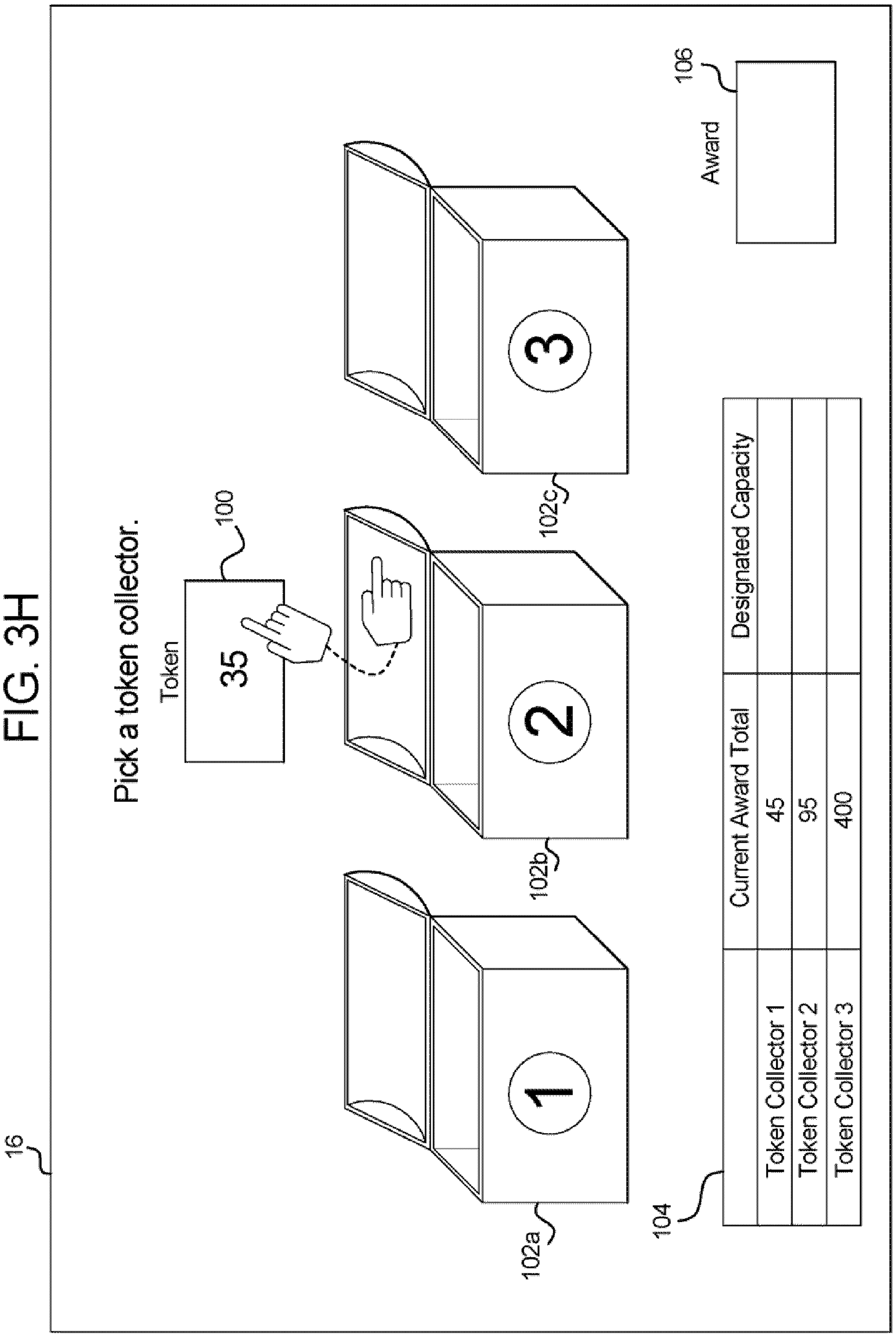

Referring to FIG. 3H, the gaming system displays a token in token display 100 including an award of 35 credits and instructs the player to pick a token collector. The player touches the display 16 and drags and drops the token at token collector two 102*b*, as illustrated in FIG. 3H. Table 104 then reflects that the current award total of token collector two 102*b* is 95 credits. For this selection, the player continues a strategy of alternating the placement of relatively smaller awards between token collector one 102*a* and token collector two 102*b*. At this point, the player may be getting a little bit nervous, as any token collector could fill at any time. However, as illustrated in FIG. 3H, none are yet full and the gaming system'still has not displayed the designated token capacities of any of the token collectors.

Figure 3I:
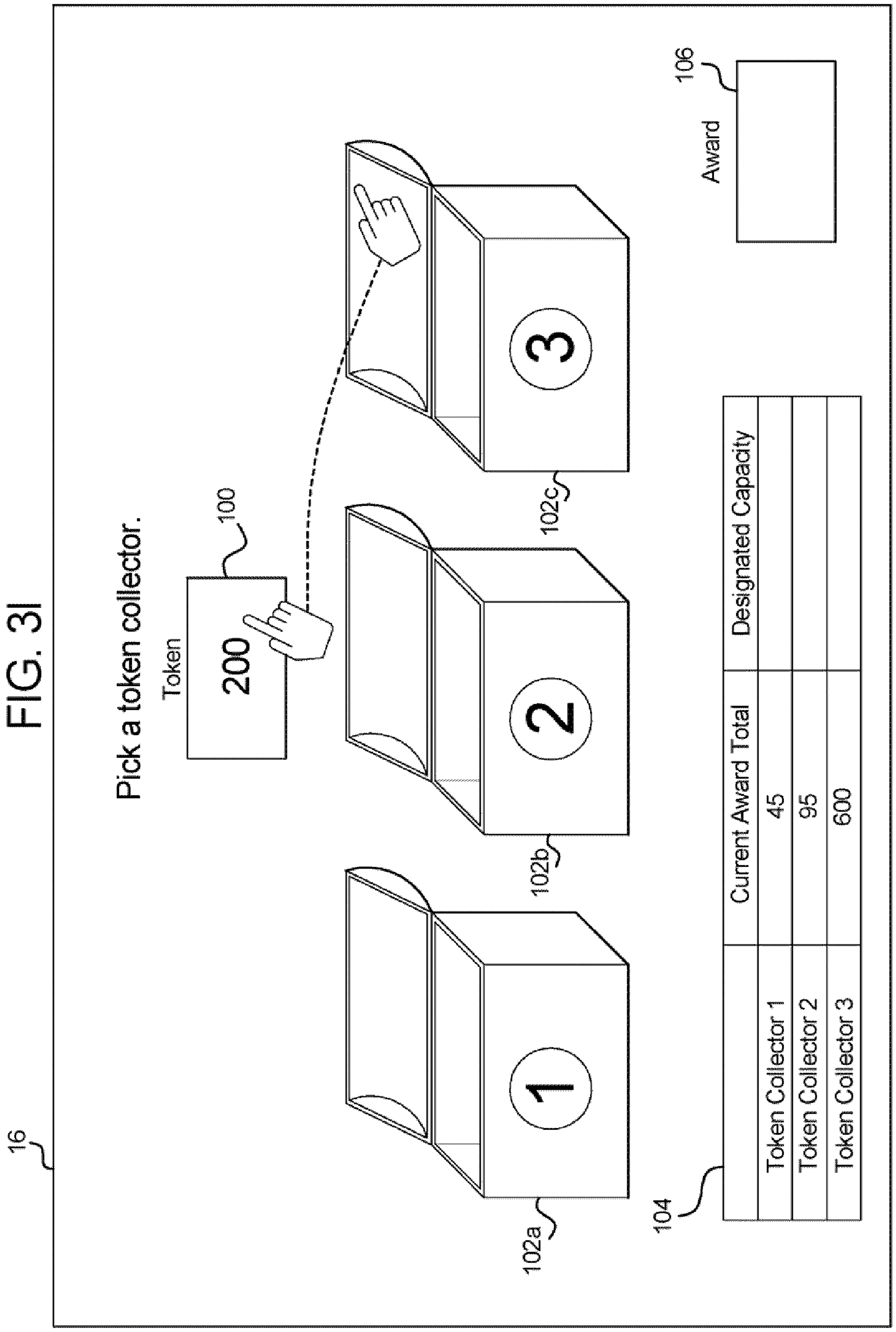

Referring to FIG. 3I, the gaming system displays a token in token display 100 including an award of 200 credits and instructs the player to pick a token collector. The player touches the display 16 and drags and drops the token at token collector three 102*c*, as illustrated in FIG. 3I. Table 104 then reflects that the current award total of token collector three 102*c* is 600 credits. For this selection, the player has continued a strategy of placing tokens including relatively larger awards in token collector 102*c*. The player is excited to see the award associated with token collector three 102*c* get so high, but has yet to overfill it. Although the gaming device has not yet displayed the designated token capacities of any of the token collectors 102*a*, 102*b* and 102*c*, the designated capacity of token collector three 102*c* in this example is actually 600 credits. In this embodiment, the gaming device does not provide the player with an award until the designated capacity of one of the token collectors is exceeded. It should be appreciated that in various other embodiments, the gaming device provides the player with the award contents of a token collector when the sum of the awards placed in the token collector is equal to the designated capacity of the token collector. It should also be appreciated that in various other embodiments, the gaming device provides the player with the award contents of a token collector when the sum of the awards placed in the token collector is equal to the designated capacity of the token collector, but not if the sum of awards placed in the token collector exceeds the designated capacity of the token collector.

Figure 3J:
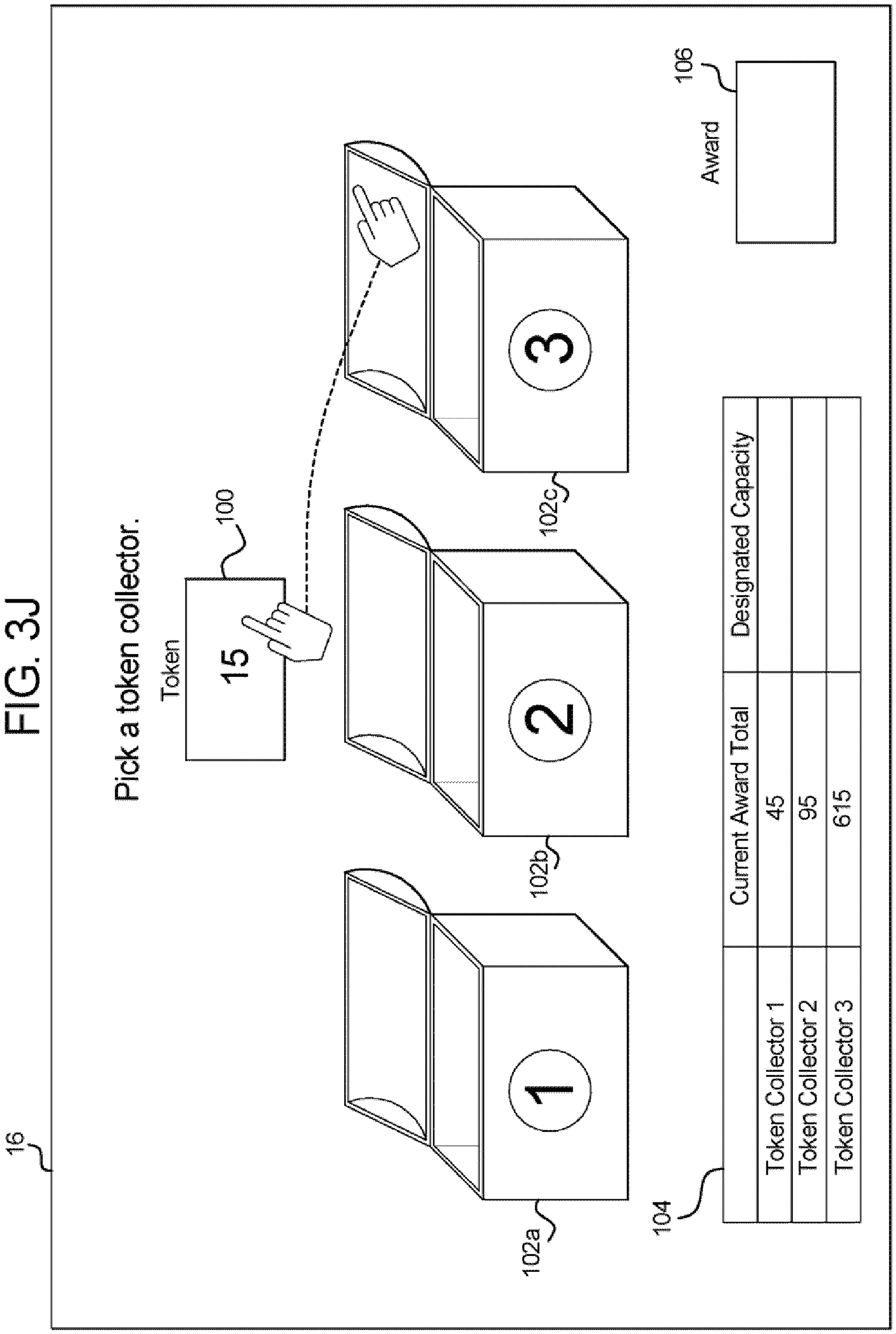
Figure 3K:
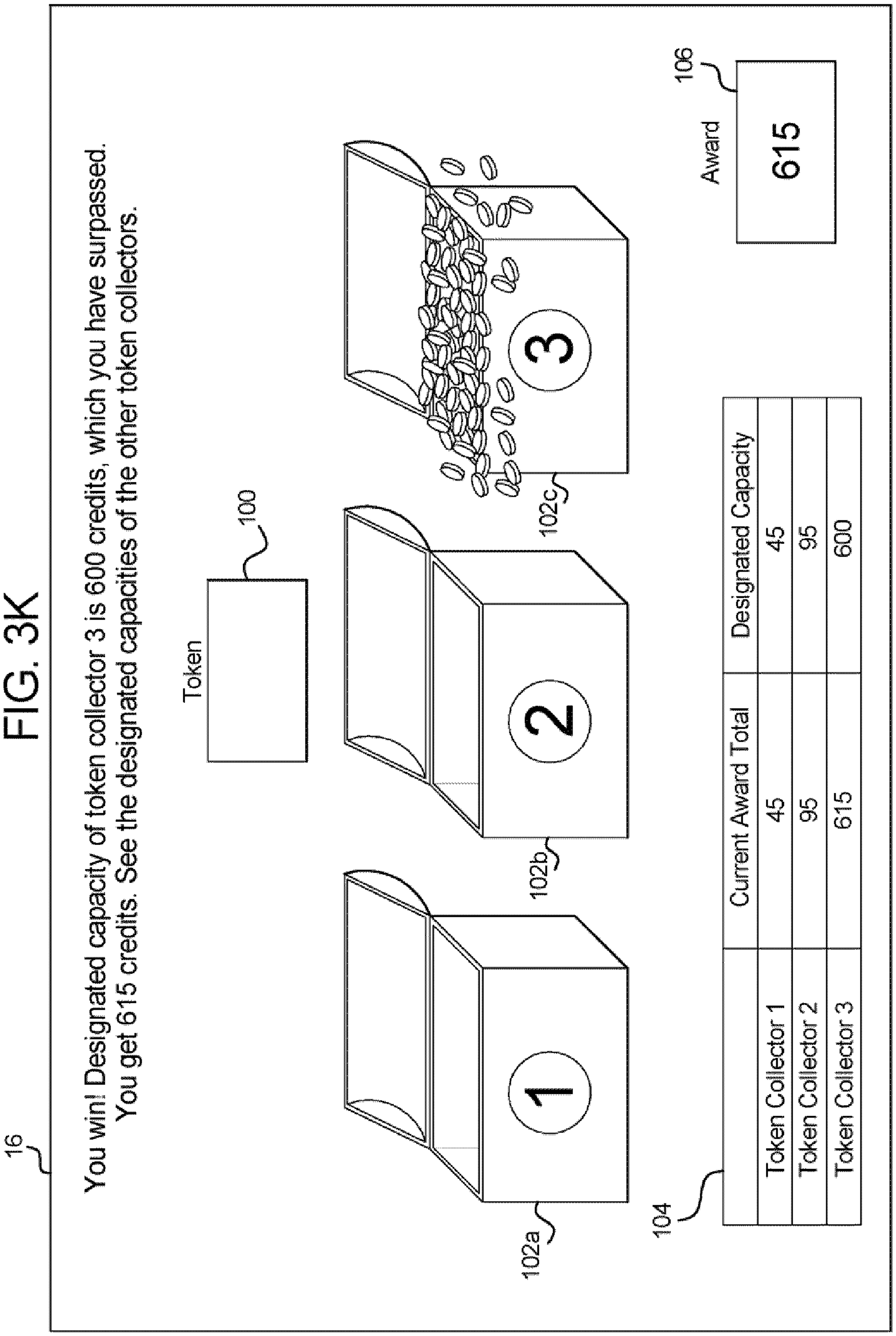

Referring now to FIG. 3J, the gaming system displays a token in token display 100 including an award of 15 credits and instructs the player to pick a token collector. The player touches the display 16 and drags and drops the token at token collector three 102*c*, as illustrated in FIG. 3J. Table 104 then reflects that the current award total of token collector three 102*c* is 615 credits. The award of 15 credits was just enough to pass the designated capacity of token collector three 102*c*. As illustrated in FIG. 3K the designated capacity of token collector three was 600 credits and thus the gaming system displays and provides the player with an award of 615 credits, as illustrated in award display 106. The player made a good decision by placing the token including an award of 15 credits into token collector three 102*c*. For prior selections, the player had been placing relatively lower awards into token collectors one 102*a* and two 102*b*. In this instance, the player figured the award total in token collector three 102*c* was getting high enough that it could reach its designated capacity at any time. The player was correct.

In this embodiment, the gaming system provides the player with an award equal to the designated capacity of a filled token collector and whatever surplus award results from the final token placement into that token collector (e.g., 615 credits as opposed to 600 credits). However, it should be appreciated that in various other embodiments, the gaming system provides a player with an award equal to the designated capacity of a filled token collector when the token collector is over-filled (e.g., in the context of this embodiment, providing the player an award of 600 credits as opposed to 615 credits). In other embodiments, the gaming system provides the player with an award equal to the surplus award (e.g., 15 credits).

Referring to FIG. 3K, now that one of the token collectors has exceeded its designated capacity, the gaming device displays the designated capacities of each of the token collectors 102*a*, 102*b*, and 102*c*. As it turns out, referring back to FIG. 3J, any of the token collectors the player placed the token including an award of 15 credits into was going to exceed its designated capacity. Thus, as indicated above, the player's placement of the token into token collector three 102*c* in FIG. 3J was a good decision.

Figure 3L:
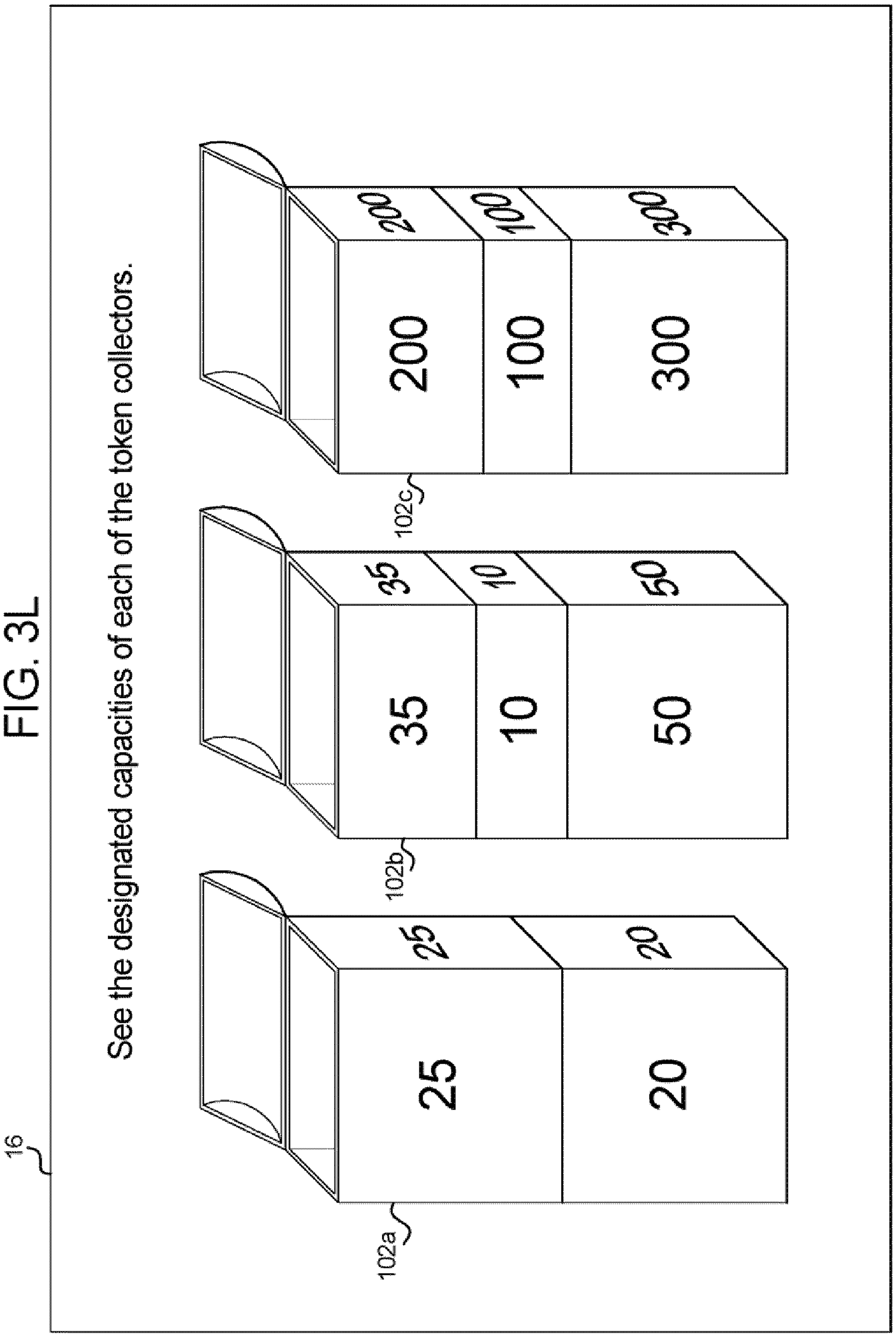

Although in FIG. 3K, the designated capacities of each of the token collectors 102*a*, 102*b*, and 102*c* are displayed in table 104, in should be appreciated that the designated token capacities and/or current award totals of table 104 may be displayed in any suitable manner. For example, in an alternative embodiment illustrated in FIG. 3L, the gaming system displays the designated capacities and awards which were placed in the respective token collectors 102*a*, 102*b*, and 102*c* graphically, such that the respective tokens including awards placed in the respective token collectors are drawn to scale.

Additionally, in various embodiments the gaming system displays the current "fill-state" of one, a plurality of or each of the token collectors. For example, in an embodiment in which the token collector is represented by a chest, if a chest is not in danger of filling up regardless of the next token, then the gaming system displays the chest as being empty. If the chest could be overfilled by a token within a designated number of future displayed tokens (e.g., within five tokens), then the chest could appear partially full with a few coins peeking out of the chest. If the chest is very close to being overfilled (e.g., within two tokens), the chest could appear almost overflowing with many coins being displayed near the top of the chest.

Multi-Player Embodiment

In one multi-player embodiment, the gaming system displays a plurality of tokens and a plurality of token collectors. Each of the token collectors has a designated token capacity. In various multi-player embodiments, the gaming system does not display the amount of or other information relating to the designated capacity of the token collectors until at least one of the token collectors reaches its respective designated capacity. The gaming system enables each of a plurality of players to assign at least one displayed token to a respective token collector until one of the token collectors reaches its designated capacity. In one embodiment, the players take turns selecting a token collector to assign respective displayed tokens to. In one such embodiment, the gaming device provides the first player to cause a token collector to reach its designated capacity with an award. In one embodiment, the award is a total award including the sum of each of the awards associated with tokens assigned to the token collector which has reached its designated capacity.

Figure 4A:
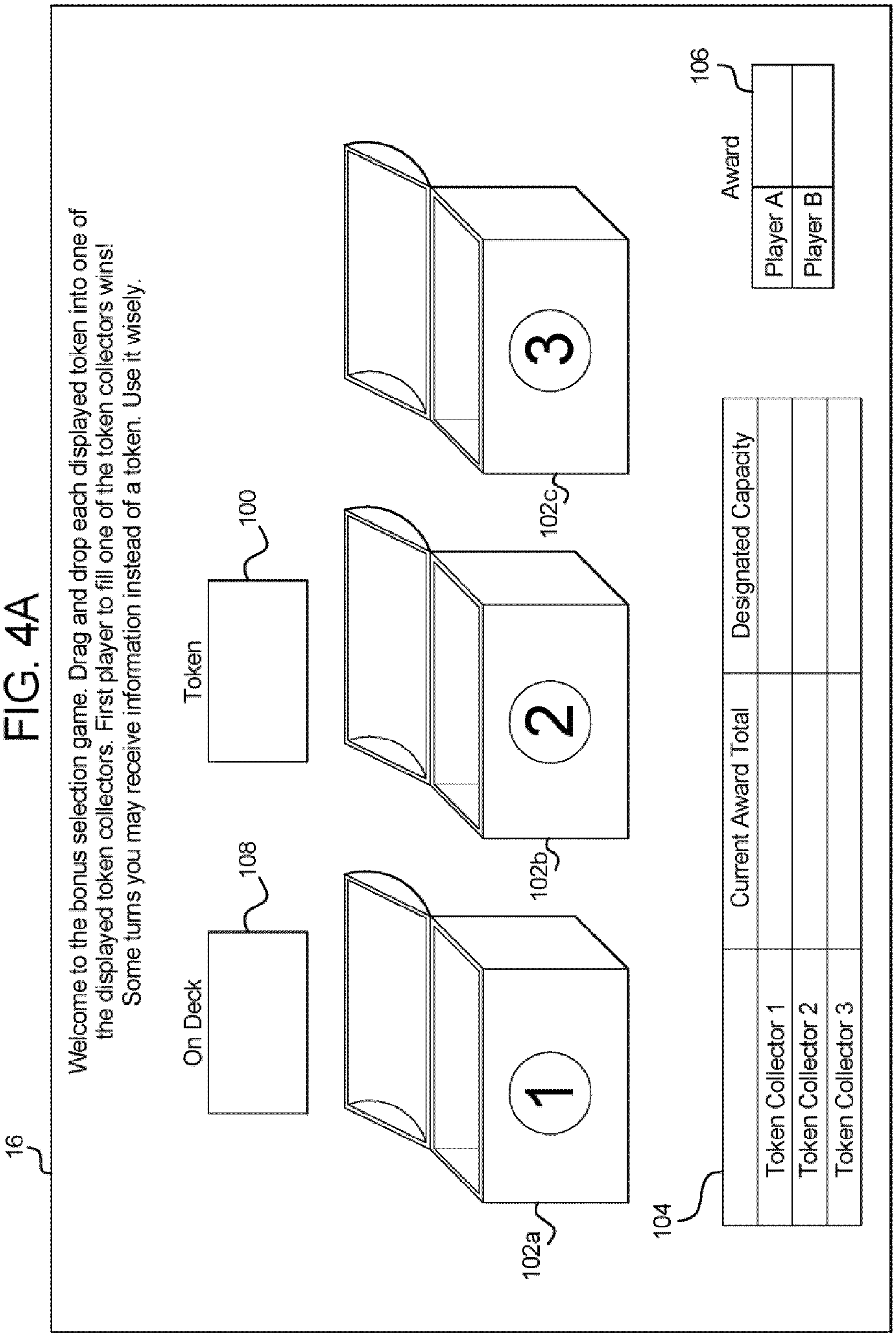
FIGS. 4A, 4B, 4C, 4D, 4E, 4F, 4G, 4H and 4I include front views of a gaming device display enabling a play of a game by multiple players in accordance with one embodiment of the gaming system disclosed herein.

Referring now specifically to FIG. 4A, in one embodiment, the selection game is a multi-player bonus game initiated by the gaming system upon the occurrence of a designated triggering event. Upon the occurrence of the designated triggering event, the gaming device displays three token collectors 102*a*, 102*b*, and 102*c*, the designated capacities of which are unknown to the player, as illustrated in FIG. 4A. The gaming system displays instructions prompting the player to drag and drop each token displayed in the token display 100 into one of the plurality of displayed token collectors, 102*a*, 102*b*, and 102*c*.

It should be appreciated that in this embodiment, each player has their own display, on which they select positions. In various other embodiments, players select positions on a single display. In other embodiments, players select positions on respective individual displays, with the gaming system also including a master display viewable be each of the players.

Figure 4B:
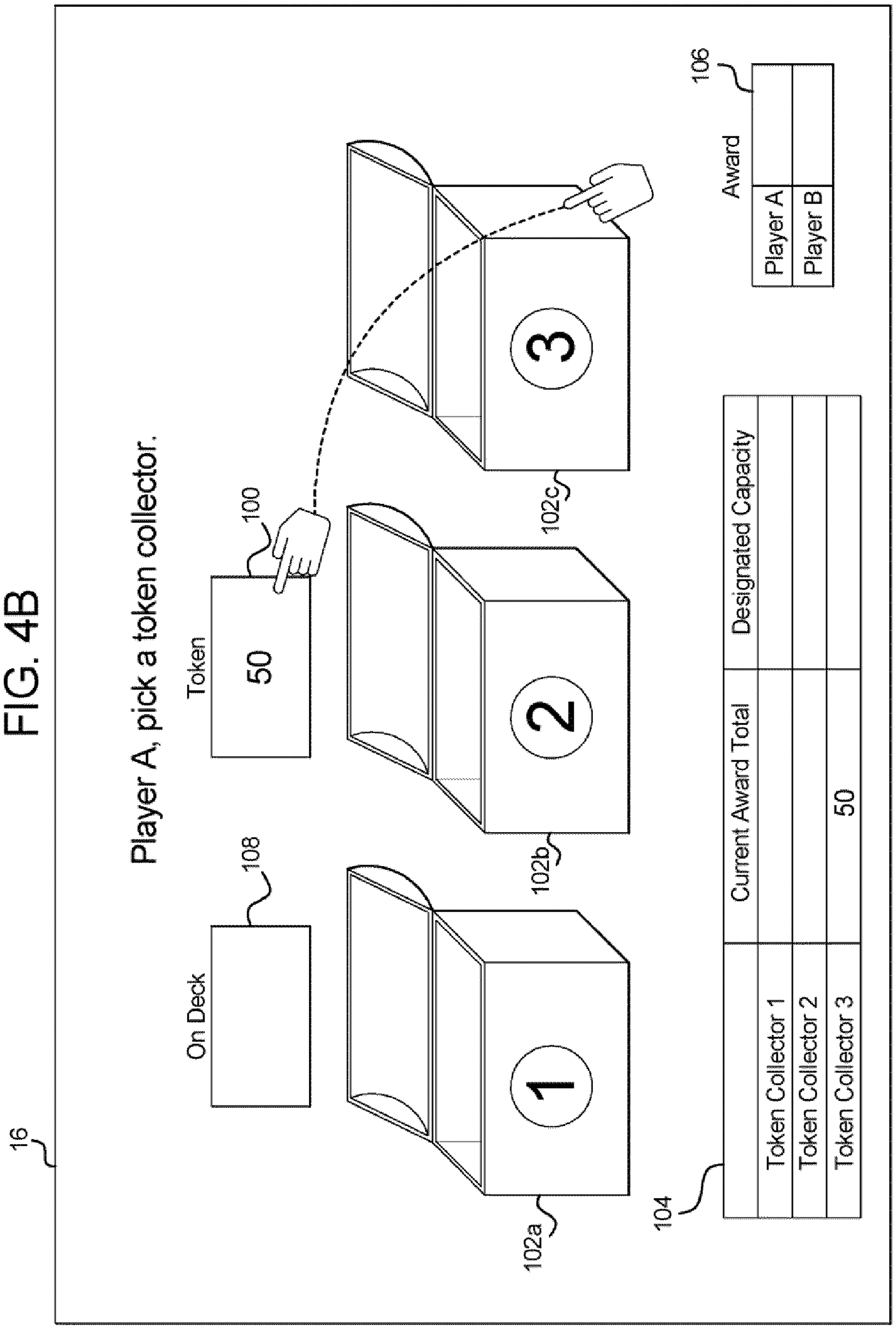

Referring now to FIG. 4B, the gaming system displays a token in token display 100 including an award of 50 credits and instructs Player A to pick a token collector. In this embodiment, preferably the display 16 is a touch screen. Player A touches the display 16 and drags and drops the token into token collector three 102*c*, as illustrated in FIG. 4B. Table 104 then reflects that the current award total of token collector three 102*c* is 50 credits. As illustrated in table 104, the gaming system does not yet display the designated token capacities of each of the token collectors 102*a*, 102*b*, and 102*c*.

It should be appreciated that although in this embodiment Player A makes the first token assignment, in various embodiments Player B makes the first token assignment. In various other embodiments, the gaming system randomly determines which of a plurality of players will make a first token collector assignment or determines which player will make a first a assignment in any suitable manner based on any suitable criteria. For example, in another embodiment, the gaming system determines which player will make the first token assignment based on an outcome of a side game.

Figure 4C:
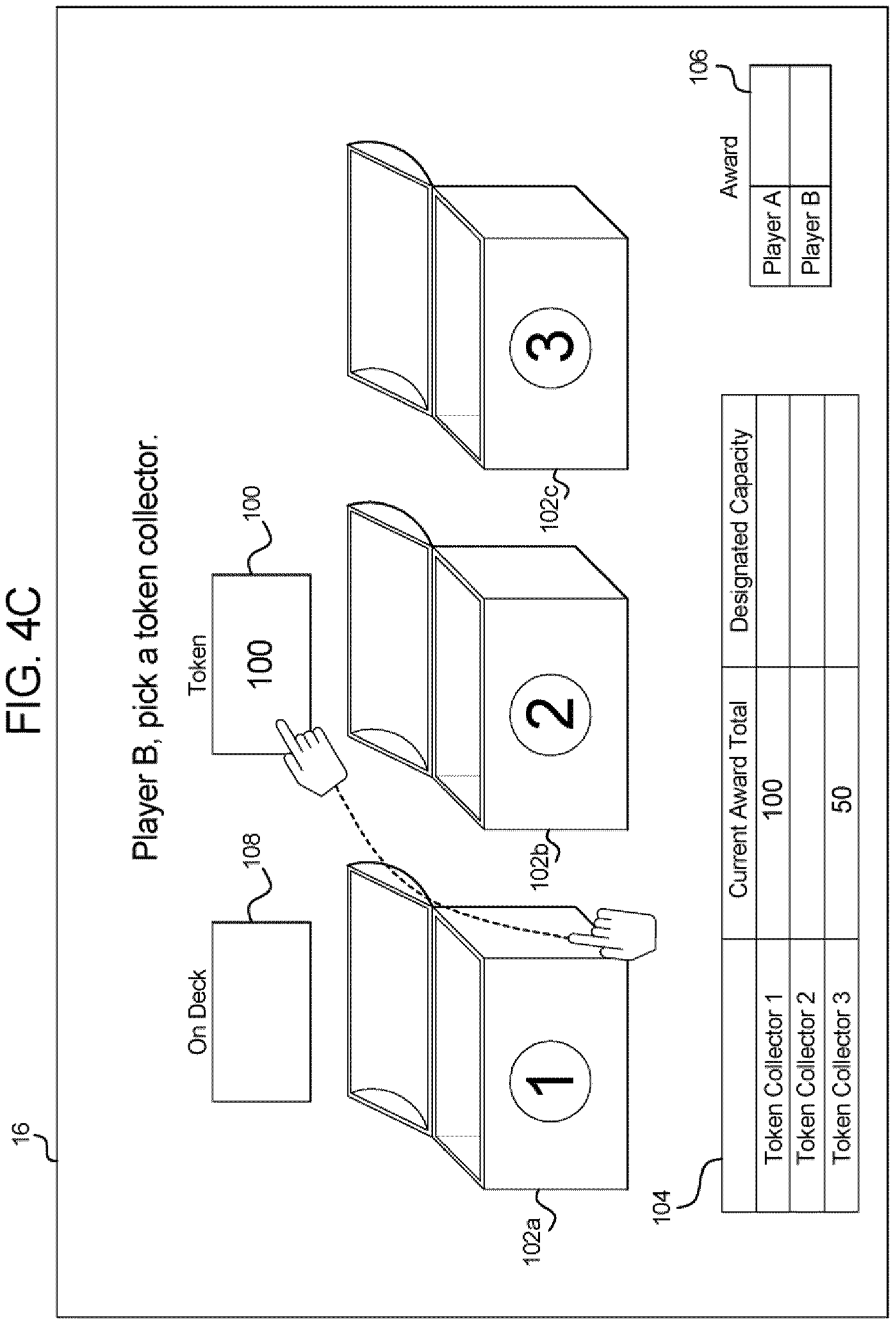

Referring to FIG. 4C, the gaming system displays a token in token display 100 including an award of 100 credits and instructs Player B to pick a token collector. Player B touches the display 16 and drags and drops the token into token collector one 102*a*, as illustrated in FIG. 4C. Table 104 then reflects that the current award total of token collector one 102*a* is 100 credits.

Figure 4D:
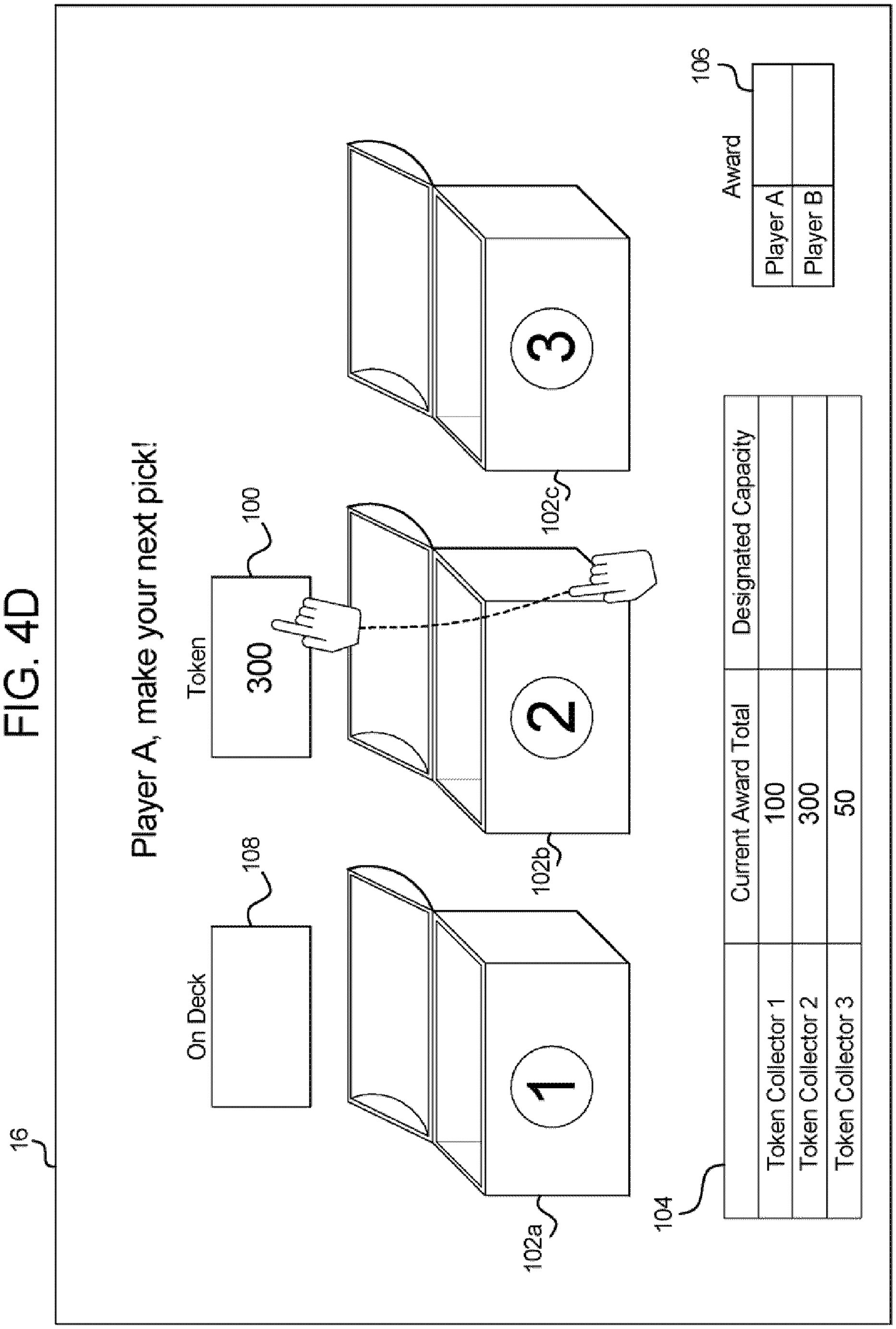

Referring to FIG. 4D, the gaming system displays a token in token display 100 including an award of 300 credits and instructs Player A to pick a token collector. Player A touches the display 16 and drags and drops the token at token collector two 102*b*, as illustrated in FIG. 4D. Table 104 then reflects that the current award total of token collector two 102*b* is 300 credits. For this selection, Player A employed a strategy of placing relatively larger awards in token collector two 102*b* because token collector 102*b* did not have any awards in it and Player A did not want to take the risk of filling the other token collectors. Player A in this example hopes to see the award size of token collector two 102*b* increase and be the player to completely fill token collector two 102*b*.

Figure 4E:
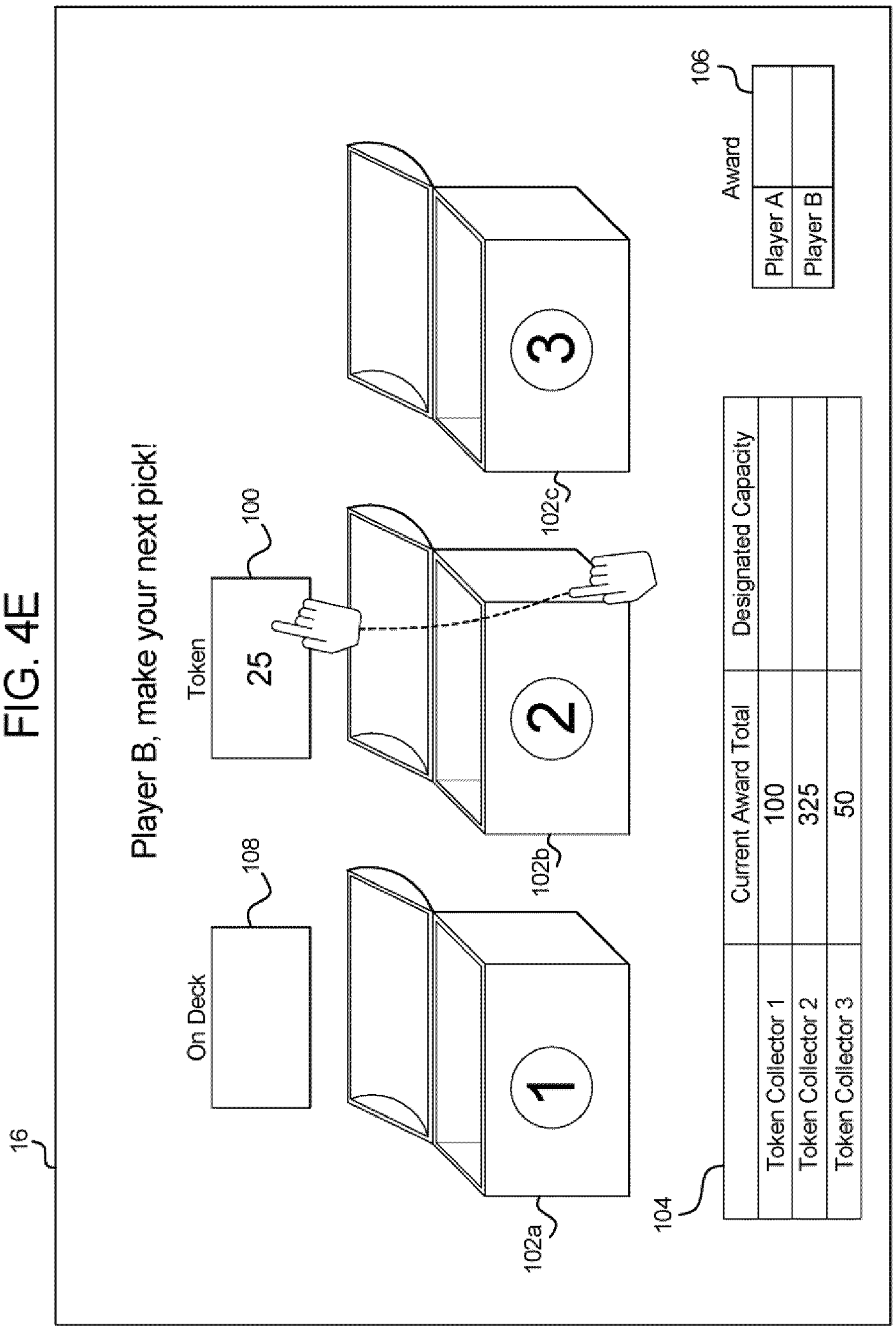

Referring to FIG. 4E, the gaming system displays a token in token display 100 including an award of 25 credits and instructs Player B to pick a token collector. In this example, Player B seems to think the designated capacity of token collector two 102*b* is reachable with this pick and wishes to sweep the 300 credit award Player A just placed in token collector two 102*b* away from Player A. Thus, Player B touches the display 16 and drags and drops the token at token collector two 102*b*, as illustrated in FIG. 4E. Table 104 then reflects that the current award total of token collector two 102*b* is 325 credits. Player B's strategy did not work in this instance. After this pick, none of the token collectors 102*a*, 102*b*, or 102*c* have reached their designated capacity and thus, Player B does not receive an award.

Figure 4F:
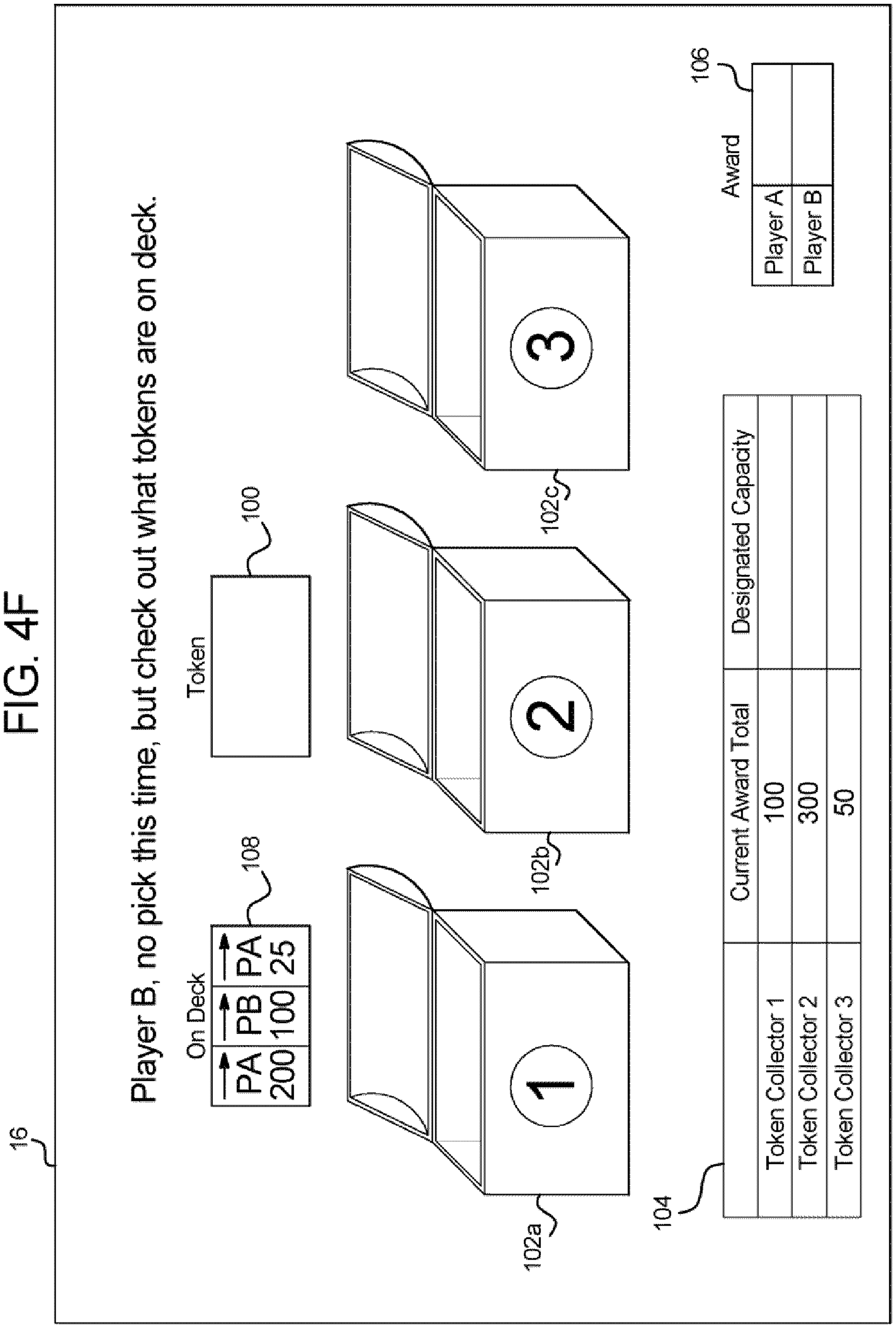

In one embodiment, referring now to FIG. 4F (an alternative to Player B's turn in FIG. 4E provided for illustrative purposes), instead of instructing Player B to make a pick, the gaming system indicates to Player B the next three tokens which the gaming device will generate and display in the "ON DECK" display 108. In this embodiment, the ON DECK display 108 includes an illustration of which player will make a token collector assignment for each respective previewed token. It should be appreciated that in various other embodiments, the gaming system does not display such information or may display other suitable token information. Further, it should be appreciated that although in this embodiment, the gaming system illustrates the next three tokens the gaming system will display, in various other embodiments, the gaming system may display any suitable number of subsequent tokens. It should also be appreciated that in various embodiments, the gaming system displays what tokens are "ON DECK" for: (a) one or more designated durations of time during a play of the game; (b) certain stages of a play of the game; (c) the entire play of the game; (d) certain player turns during the play of the game; and (e) any suitable combination of these.

In this embodiment, each player has their own display and thus, the gaming system displays the information in FIG. 4F exclusively to Player B. However, it should be appreciated that in various embodiments, the gaming system displays this information to more than one designated player or all players playing the selection game.

Referring again to FIG. 4F, the gaming system's display of such subsequent token information, in place of providing Player B with a token collector pick for that selection, enables Player B to make a better informed subsequent selection because Player B now knows what their next and Player A's next two tokens will be. However, Player B still runs the risk that Player A could fill one of the token collectors with their next selection.

For instance, FIG. 4F illustrates that the token for Player A's next selection will be associated with an award of 25 credits. Thus, the gaming system enables Player B to infer that Player A will most likely once again try to fill token collector two 102*b*, since it has the highest award total and Player B tried to do so their last pick, as illustrated in FIG. 4E. The gaming system also displays that Player B's next token will be associated with an award of 100 credits, as illustrated in ON DECK display 108. Thus, the gaming system enables Player B to infer that if Player A does not cause a token collector to fill up with their next selection, Player B has a shot at filling a token collector with their next selection. This provides Player B with lots of excitement and creates anticipation associated with Player A's next selection.

Figure 4G:
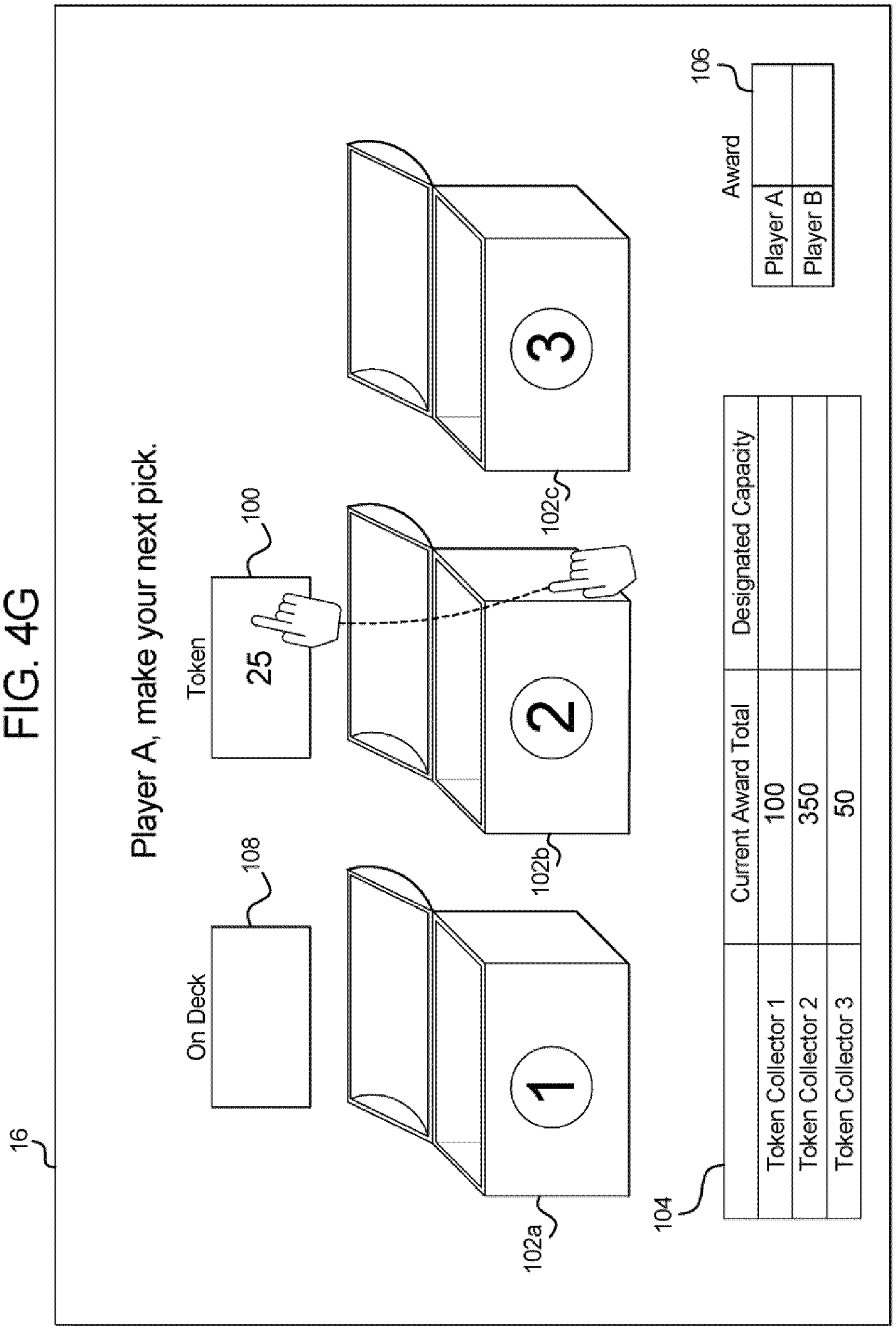

Referring now to FIG. 4G (continuing game play from Player B's selection in FIG. 4E), the gaming system displays a token in token display 100 including an award of 25 credits and instructs Player A to pick a token collector. Player A touches the display 16 and drags and drops the token at token collector two 102*b*, as illustrated in FIG. 4G. Table 104 then reflects that the current award total of token collector two 102*b* is 350 credits. Player A once again tried to cause token collector two 102*b* to fill, but token collector two 102*b* still has not reached its designated capacity.

Figure 4H:
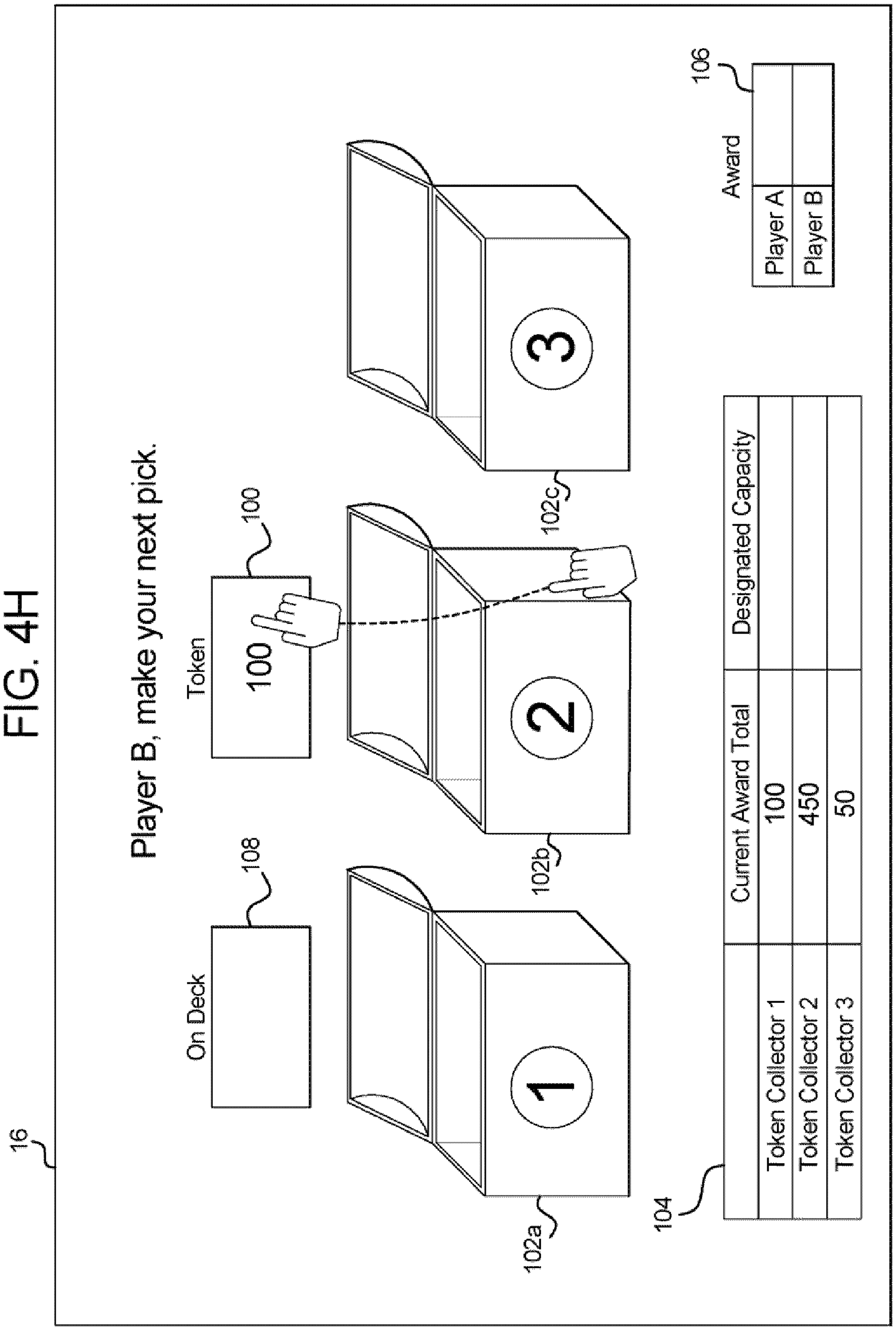
Figure 4I:
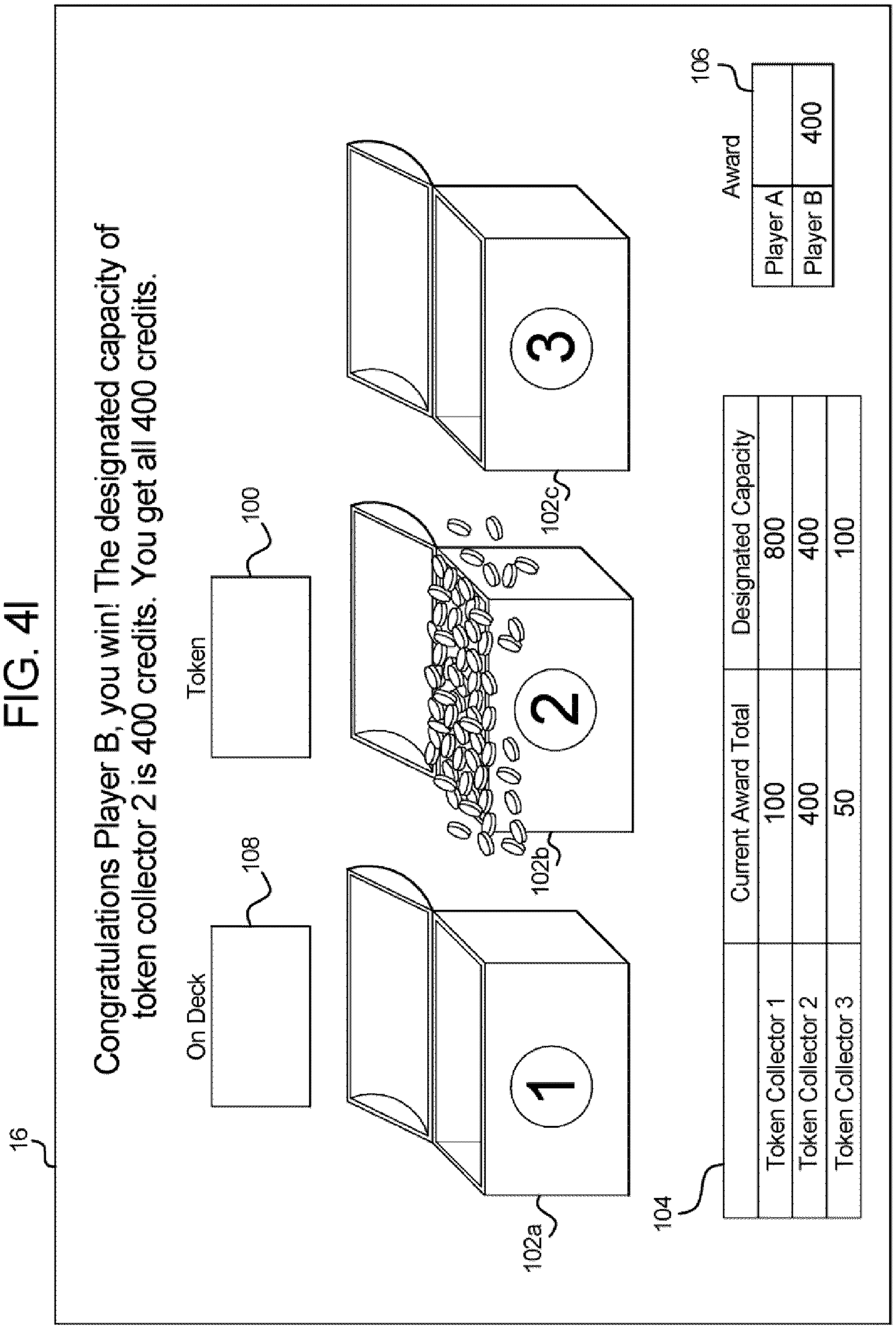

Referring to FIG. 4H, the gaming system displays a token in token display 100 including an award of 100 credits and instructs Player B to pick a token collector. Player B touches the display 16 and drags and drops the token at token collector two 102*b* hoping this time to cause token collector two 102*b* to fill, as illustrated in FIG. 4H. Table 104 then reflects that the current award total of token collector two 102*b* is 450 credits. The award of 100 credits was enough to pass the designated capacity of token collector two 102*b*. As illustrated in FIG. 4I, the designated capacity of token collector two was 400 credits and thus, the gaming system displays and provides the player with an award of 400 credits, as illustrated in award display 106. Referring to FIG. 4I, the gaming system now displays the designated capacity of each of the token collectors 102*a*, 102*b*, and 102*c*. As it turns out, although the players got into a competition to fill token collector two 102*b*, token collector one 102*a* had a designated capacity of 800 credits. This is an example of the dynamic any given play of the selection game can take, when the players do not know the designated capacity of each token collector. The players not having this information, were not focusing their efforts on the optimal token collector.

In this embodiment, the gaming system does not provide a player with an award until the designated capacity of one of the token collectors is exceeded. It should be appreciated that in various other embodiments, the gaming system provides the player with the award contents of a token collector when the sum of the awards placed in the token collector is equal to the designated capacity of the token collector.

In this embodiment, the gaming system provides the player with an award equal to exactly the designated capacity of a filled token collector (e.g., 400 credits as opposed to 450 credits). However, it should be appreciated that in various other embodiments, the gaming system provides a player with an award equal to the designated capacity of a filled token collector and whatever surplus award results from the final token placement when the token collector is over-filled (e.g., in the context of this embodiment, providing the player an award of 450 credits as opposed to 400 credits).

In another single player or multi-player embodiment, the gaming system displays a plurality of tokens and a plurality of token collectors. Each of the token collectors has a designated token capacity. In this embodiment, the designated token capacity of each token collector is a number of tokens and each of the token collectors is associated with an award. The gaming system enables each of a plurality of players to assign at least one displayed token to a respective token collector until one of the token collectors reaches its designated capacity. In this embodiment, the award associated with each token collector is generally proportional to its respective designated capacity (e.g., the higher the designated capacity, the higher the award). However, it should be appreciated that in various other embodiments, the award associated with each respective token collector is not proportional to its designated capacity.

Figure 5A:
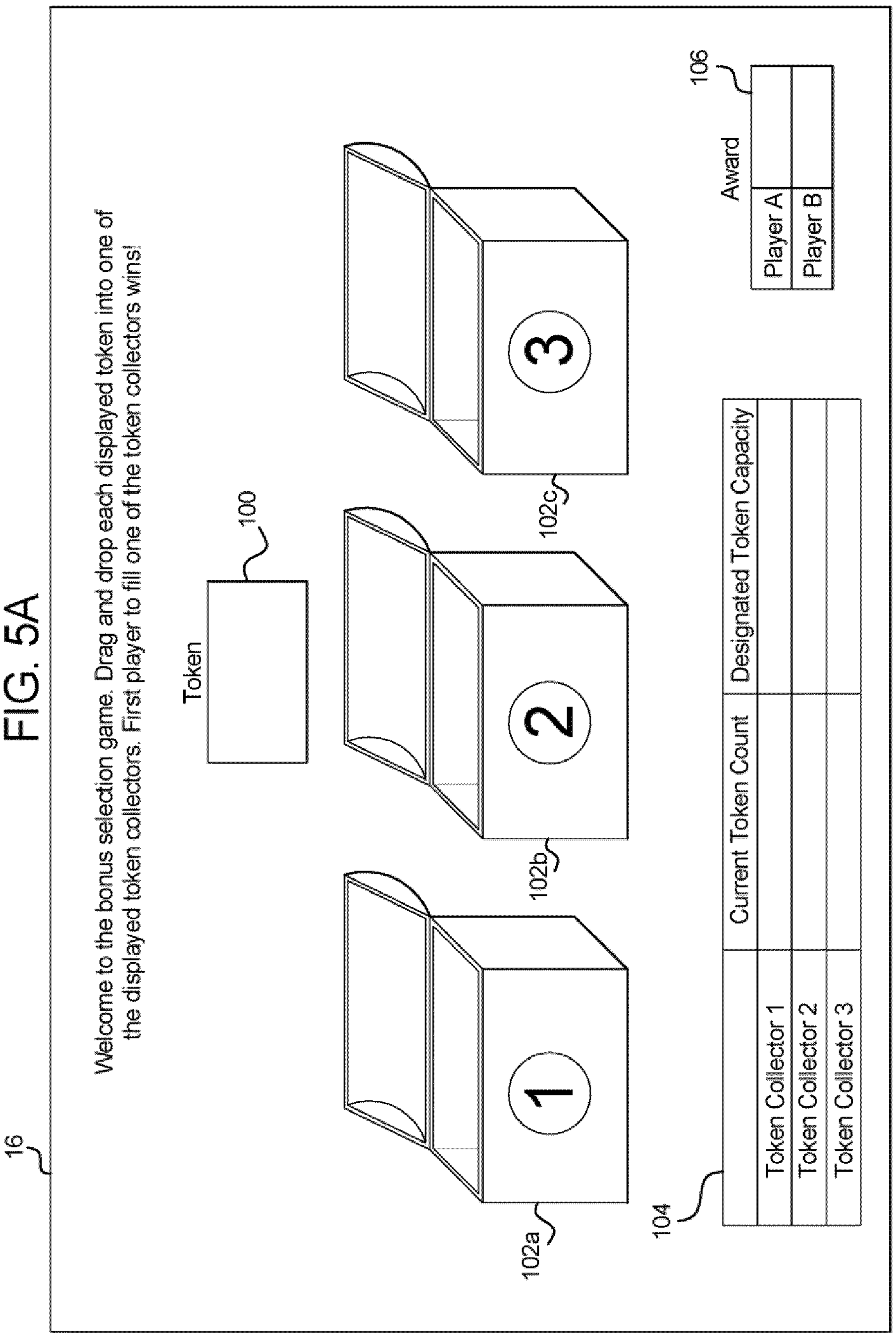
FIGS. 5A, 5B, 5C, 5D, 5E, 5F, 5G and 5H include front views of a gaming device display enabling a play of a game by multiple players in accordance with one embodiment of the gaming system disclosed herein.

Referring now specifically to FIG. 5A, in one embodiment, the selection game is a multi-player bonus game initiated by the gaming system upon the occurrence of a designated triggering event. Upon the occurrence of the designated triggering event, the gaming device displays three token collectors 102*a*, 102*b*, and 102*c*, the designated capacities of which are unknown to the player, as illustrated in FIG. 5A. The gaming system displays instructions prompting the player to drag and drop each token displayed in the token display 100 into one of the plurality of displayed token collectors, 102*a*, 102*b*, and 102*c*. In this embodiment, the tokens are represented by a star symbol and are not each associated with an award, but rather count as a unit of one in contributing to each of the token collectors reaching their designated token capacity.

Figure 5B:
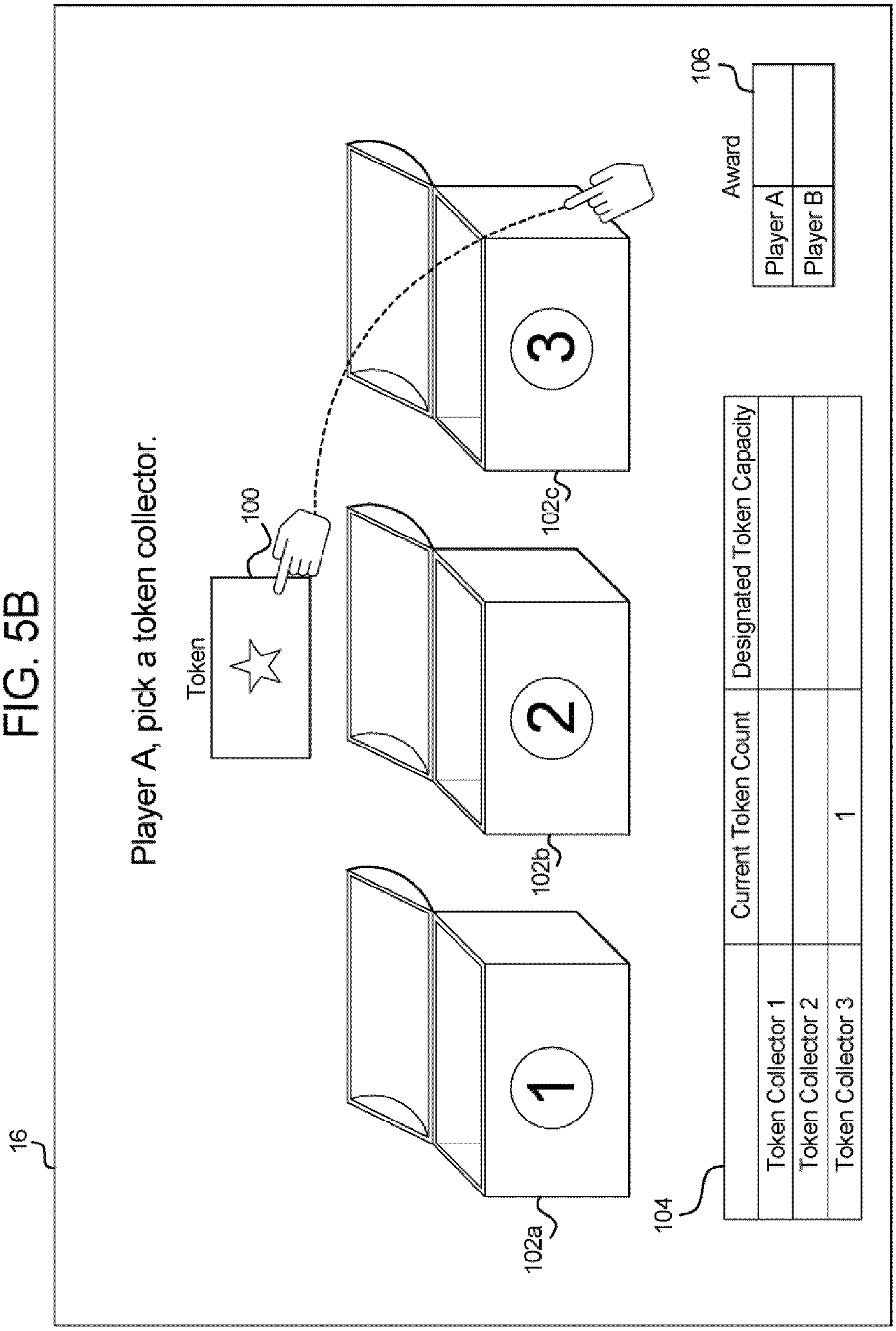

Referring now to FIG. 5B, the gaming system displays a token in token display 100 and instructs Player A to pick a token collector. In this embodiment, preferably the display 16 is a touch screen. Player A touches the display 16 and drags and drops the token into token collector three 102*c*, as illustrated in FIG. 5B. Table 104 then reflects that the current token count of token collector three 102*c* is one token. As illustrated in table 104, the gaming system does not yet display the designated token capacities of each of the token collectors 102*a*, 102*b*, and 102*c*.

Figure 5C:
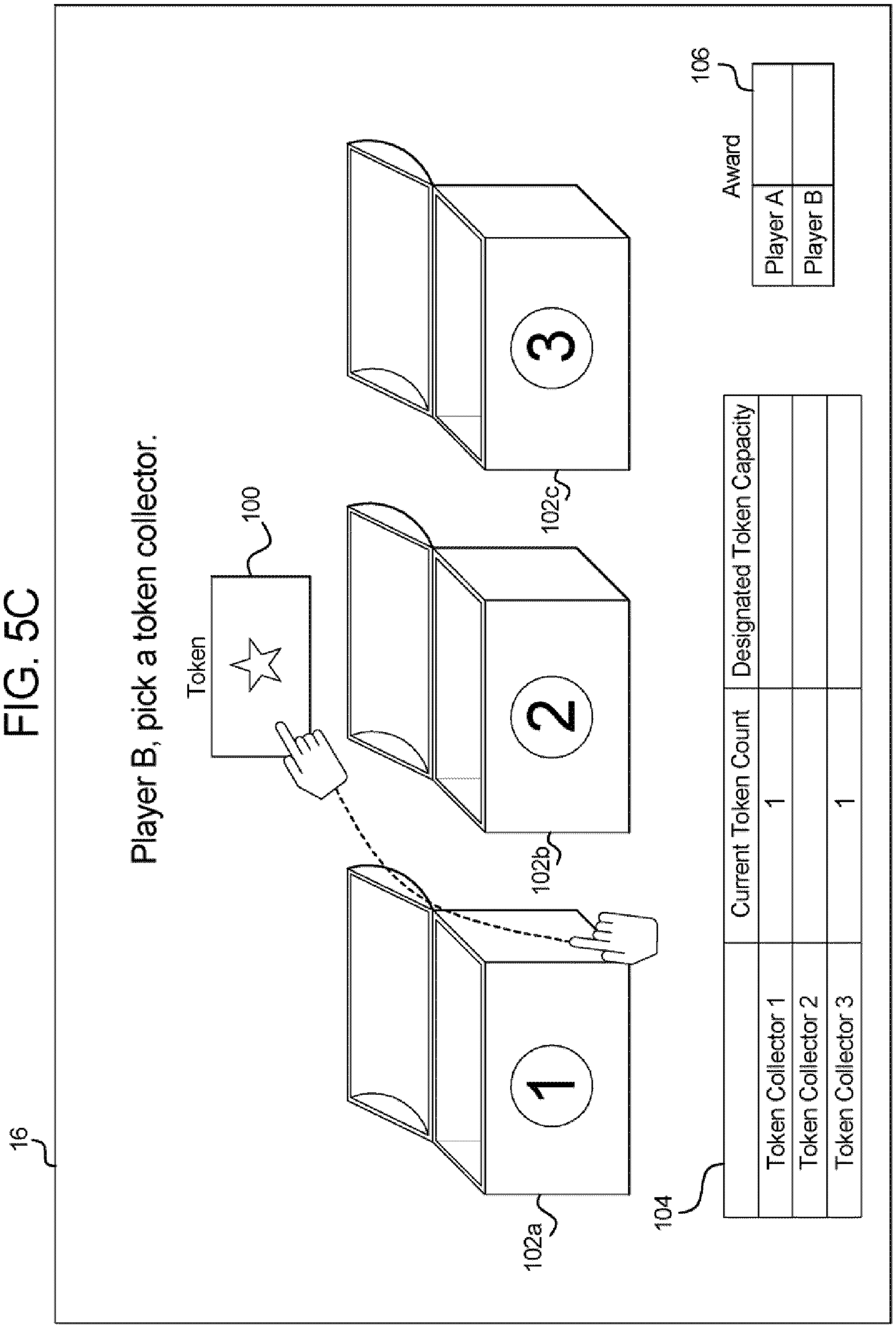

Referring to FIG. 5C, the gaming system displays a token in token display 100 and instructs Player B to pick a token collector. Player B touches the display 16 and drags and drops the token into token collector one 102*a*, as illustrated in FIG. 5C. Table 104 then reflects that the current token count of token collector one 102*a* is one token.

Figure 5D:
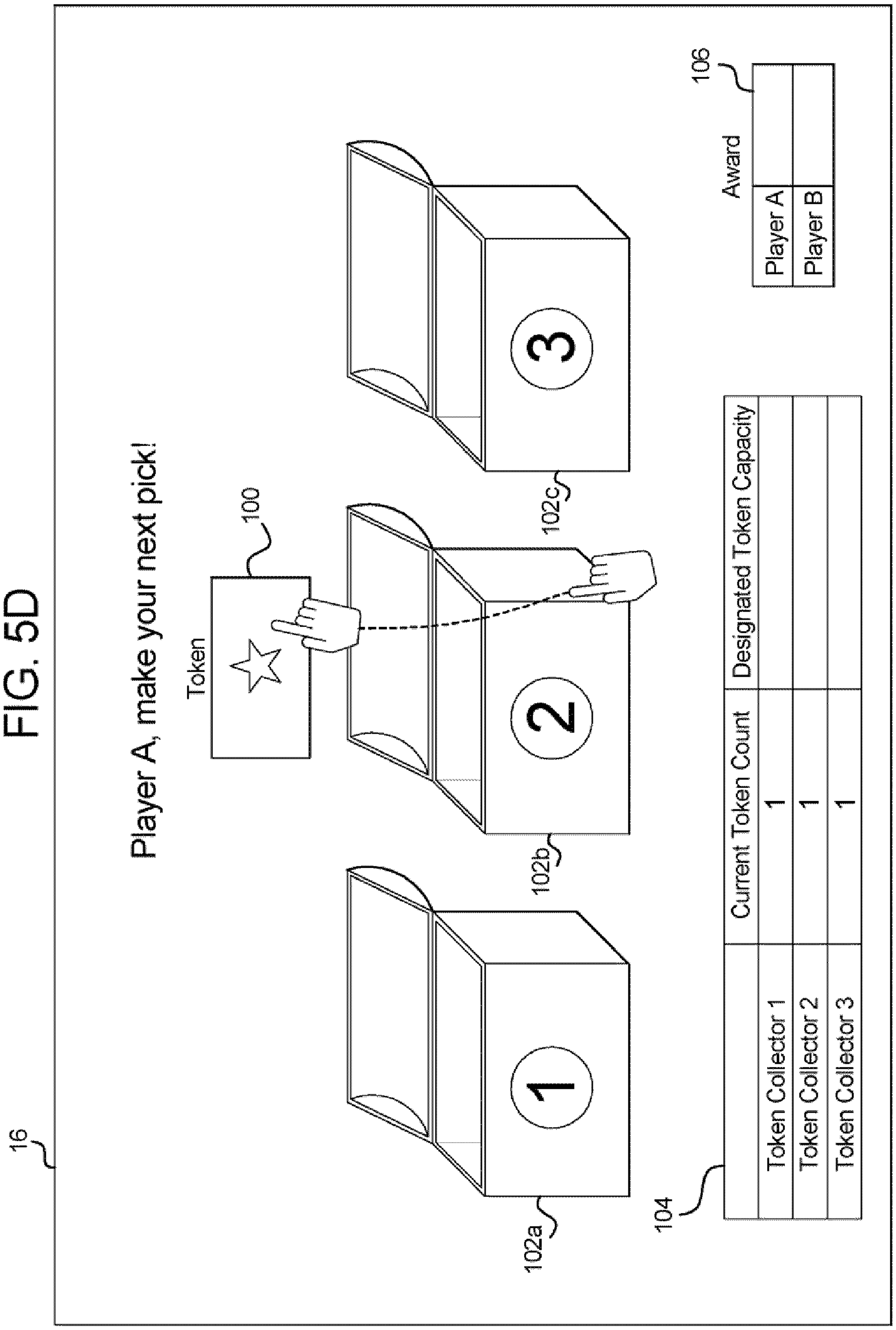

Referring to FIG. 5D, the gaming system displays a token in token display 100 and instructs Player A to pick a token collector. Player A touches the display 16 and drags and drops the token at token collector two 102*b*, as illustrated in FIG. 5D. Table 104 then reflects that the current token count of token collector two 102*b* is one token.

Figure 5E:
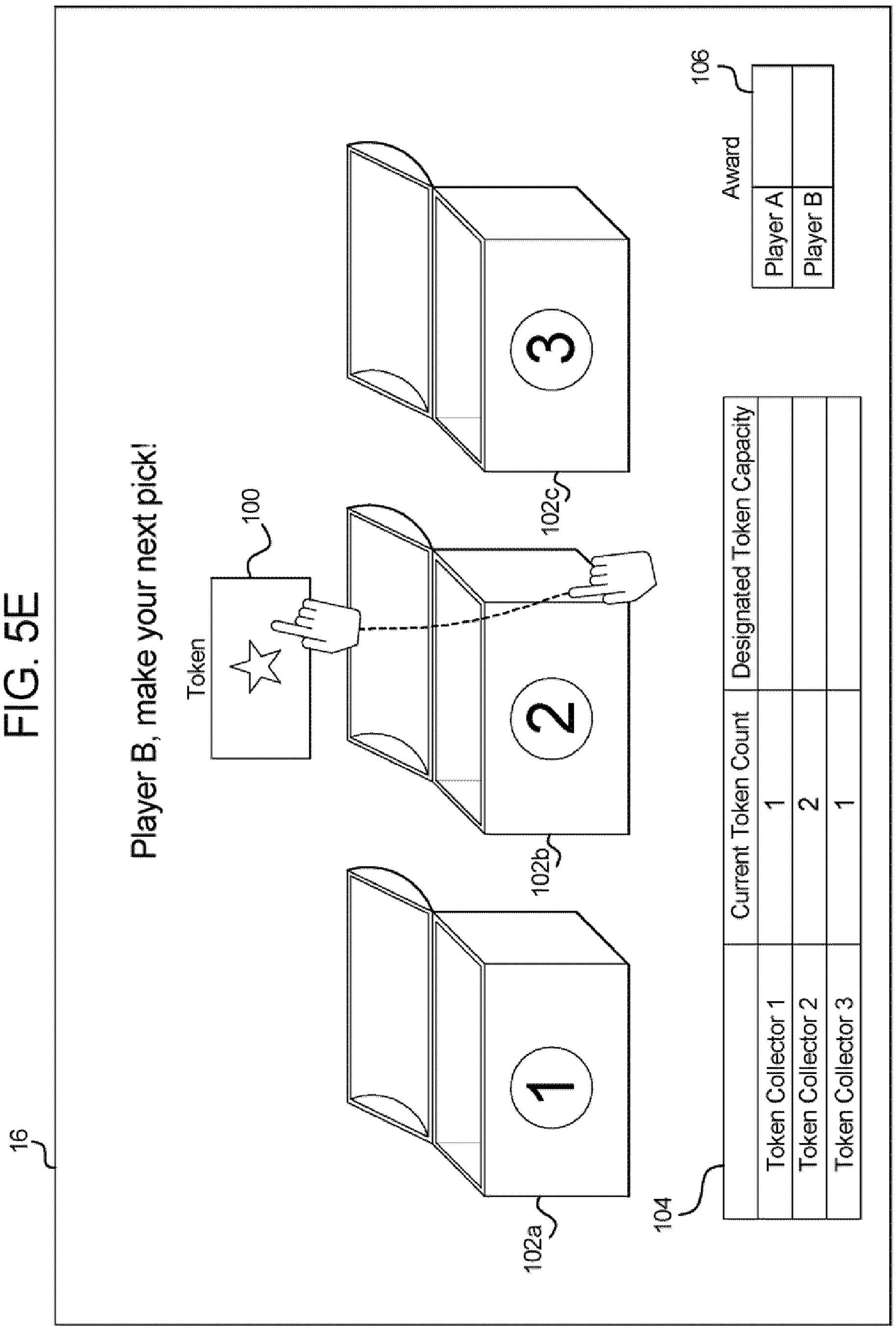

Referring to FIG. 5E, the gaming system displays a token in token display 100 and instructs Player B to pick a token collector. In this example, Player B seems to think the designated capacity of token collector two 102*b* is reachable. Thus, Player B touches the display 16 and drags and drops the token at token collector two 102*b*, as illustrated in FIG. 5E. Table 104 then reflects that the current token count of token collector two 102*b* is two tokens. Player B's strategy did not work in this instance. After this pick, none of the token collectors 102*a*, 102*b*, or 102*c* have reached their designated token capacity and thus, Player B does not receive an award.

Figure 5F:
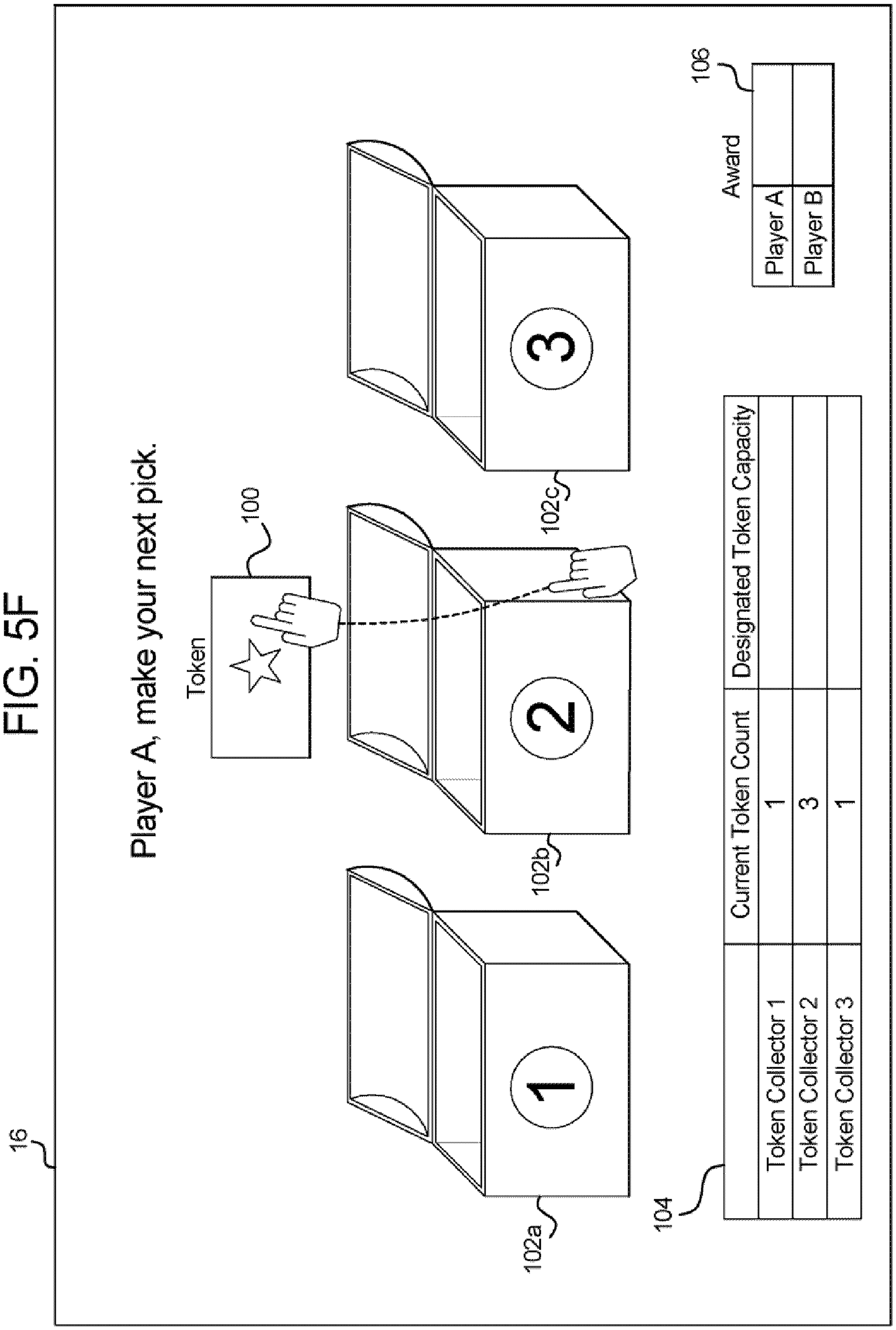

Referring now to FIG. 5F, the gaming system displays a token in token display 100 and instructs Player A to pick a token collector. Player A touches the display 16 and drags and drops the token at token collector two 102*b*, as illustrated in FIG. 5F. Table 104 then reflects that the current token count of token collector two 102*b* is three tokens. Player A once again tried to cause token collector two 102*b* to fill, but token collector two 102*b* still has not reached its designated token capacity.

Figure 5G:
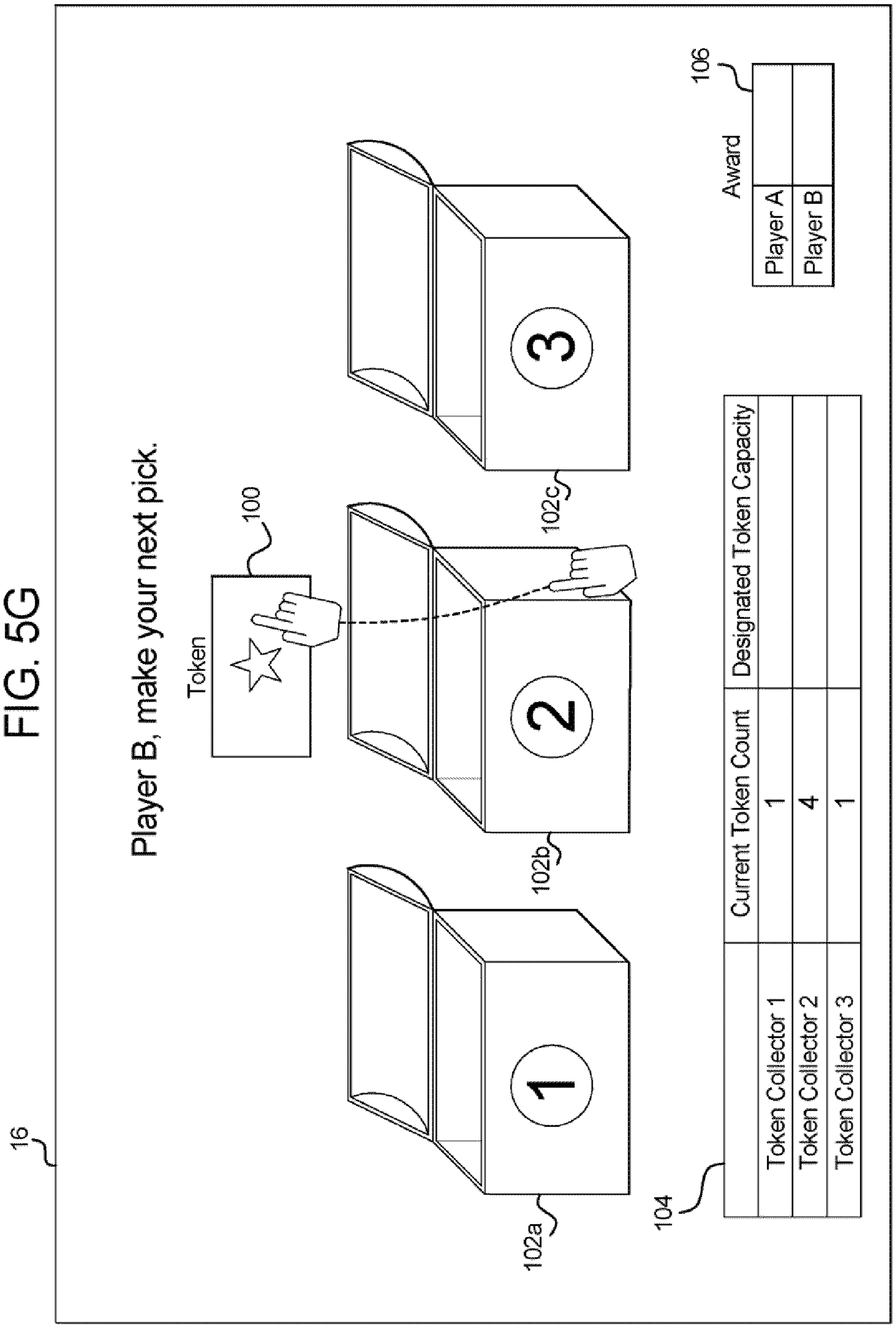
Figure 5H:
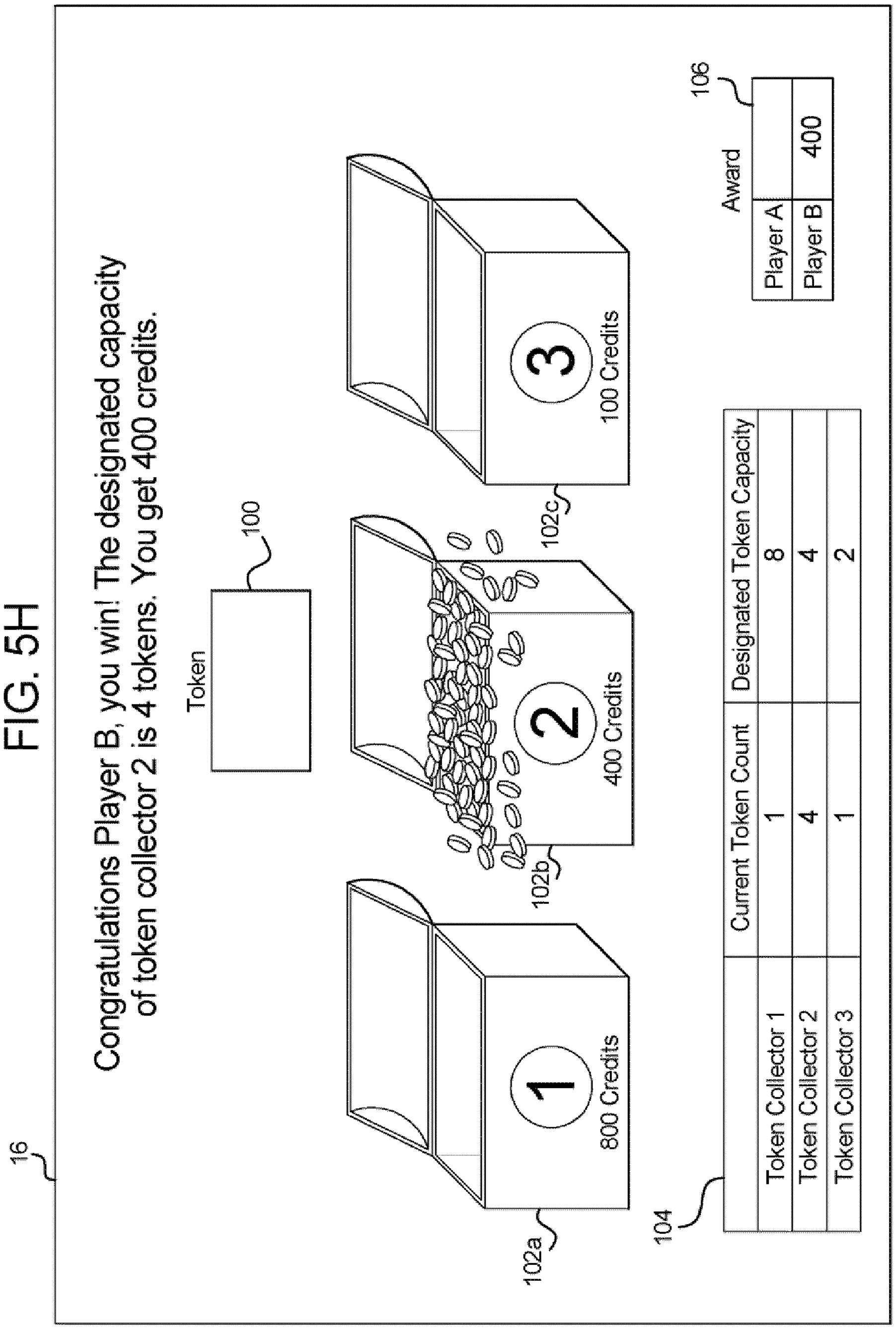

Referring to FIG. 5G, the gaming system displays a token in token display 100 including an award of 100 credits and instructs Player B to pick a token collector. Player B touches the display 16 and drags and drops the token at token collector two 102*b* hoping this time to cause token collector two 102*b* to fill, as illustrated in FIG. 5G. Table 104 then reflects that the current token count of token collector two 102*b* is four tokens. As illustrated in FIG. 5H, the designated token capacity of token collector two was four tokens and thus, the gaming system displays and provides the player with the award of 400 credits associated with token collector two 102*b*, as illustrated in award display 106. Referring to FIG. 5H, the gaming system now displays the designated token capacity of each of the token collectors 102*a*, 102*b*, and 102*c*. As it turns out, although the players got into a competition to fill token collector two 102*b*, token collector one 102*a* had a designated token capacity of eight tokens, which had a higher award of 800 credits than token collector two 102*b*. This is another example of the dynamic any given play of the selection game can take, when the players do not know the designated capacity of each token collector. The players not having this information, were not focusing their efforts on the optimal token collector.

As illustrated in FIG. 5H, along with the designated token capacities of the token collectors which did not reach their designated token capacities in table 104, the gaming system also displays the awards associated with the token collectors (token collector one 102*a* and token collector three 102*c*) which did not reach their designated capacities.

Although in the above examples multiple actual players play the selection game, in various other embodiments, the gaming system enables a single player to play a multi-player configuration of the selection game. In such embodiments, the gaming system simulates the play of one or more additional players. It should also be appreciated that any of the embodiments disclosed herein may be configured as single player games.

Persistence Embodiment

In another embodiment, the selection game is an extended or persistence type game including a plurality of tokens and a plurality of token collectors. Each of the token collectors has a designated token capacity. In various persistence-type embodiments, the gaming system does not display information relating to the designated capacity of the token collectors until at least one of the token collectors reaches its respective designated capacity.

In one such embodiment in which the persistence type selection game is a single player game, as part of a play of a primary or base game, the gaming system displays tokens, which the player assigns to one of the at least two token collectors in the persistence type selection game. In one such embodiment, the gaming system requires that the player assign tokens to respective token collectors in the persistence type selection game as the gaming system displays the tokens in the primary or base game. The gaming system continues to display tokens and enables a player to assign each displayed token to a respective one of the token collectors until one of the token collectors reaches its designated capacity. In another embodiment, the gaming system enables the player to store tokens displayed in the primary or base game such that the tokens may be assigned to a respective token collector in the persistence type game at a later time. The persistence type selection game described above in various other embodiments is provided as a multi-player game.

In other such embodiments, one or more players (dependent on whether the selection game is a single player or multi-player game) may enter or play the selection game: (a) at designated time intervals; (b) as a bonus award associated with a play of another game; (c) by placing a wager of a designated number of credits; (d) any combination of these; and (e) in any other manners.

The foregoing embodiments have been provided for illustrative purposes. It should be appreciated that in various embodiments, the selection game may vary in a variety of manners.

It should be appreciated that although in the foregoing embodiments, the designated capacity included a sum of award values associated with respective tokens, the designated capacity may include various game components. In various embodiments, the designated capacity may include: (a) a sum of a plurality of award values, each award value associated with a token; (b) a total number of tokens; and (c) a total number of points associated with a plurality of tokens, wherein each of the plurality of tokens is associated with a number of points.

In various single player and multi-player embodiments, one or more of a plurality of token collectors includes a designated capacity (or depth) which will not be reached during a play of the game, or a "bottomless" depth. In such embodiments, players would be provided with excitement because these token collectors require the player or players to implement the additional strategy of identifying bottomless token collectors. Tokens would continuously be placed in such collectors, with no player ultimately winning an award associated with that particular token collector.

It should be appreciated that in various embodiments, the designated capacity of each of the plurality of token collectors included in a play of the selection game is determined: (a) randomly as a group; (b) randomly on a separate basis; (c) randomly from a plurality of predetermined groups of designated capacity combinations; and (d) in a predetermined fashion from a plurality of groups of designated capacity combinations. In various other embodiments, the sum of the designated capacities of each of the token collectors is always the same, but the designated capacities of each respective token collector are randomly allocated amongst the token collectors.

In various embodiments, the designated capacity of each of the respective token collectors is the same from game to game, but the gaming device does not display the designated capacity of the token collectors (or which token collector is associated with which capacity) to the one or more players playing the selection game at the beginning of play of the selection game. In various other embodiments, the capacity of each of the respective token collectors associated with the selection game is randomly determined at the beginning of each respective play of the selection game.

In each of the foregoing and various embodiments, each play of the selection game is associated with a plurality of token collectors. In various embodiments, the total number of token collectors associated with each play of the selection game is static during repeated plays of the selection game. In other embodiments, the number of token collectors associated with the selection game varies as a function one or more players' wager on the play of the selection game.

In various embodiments, the gaming system displays the designated capacity of one or more, but not all, of the token collectors to a player at the beginning of or prior to the end of play of a game.

In various embodiments, one or more of the token collectors is associated with a hidden award or feature which is not revealed to a player until after the respective token collector has reached its designated capacity. In various embodiments, such hidden awards are provided to the player in addition to any award associated with the combination of tokens in the token collector or the token collector itself based on a designated number of tokens being placed in the token collector.

In various other single player or multi-player embodiments, players begin play of the game with one or more token collectors already including at least one token contributing to its designated capacity.

It should be appreciated that in various embodiments, the gaming device displays various types of and quantities of information associated with a play of the selection game. In various embodiments, the displayed information includes on or more of: (a) information relating to the designated capacity of each of a plurality of token collectors; (b) information relating to the designated capacity of one or more, but not all of a plurality of token collectors; (c) information relating to the designated capacity of one or more of a plurality of token collectors relative to one or more other of the plurality of token collectors (e.g., token collector one has a greater designated capacity than token collector two); (d) information relating to the capacity of one or more of a plurality of token collectors at a given point in time; (a) information relating to a designated number of tokens which will be subsequently displayed; (f) information about the designated capacities of certain token collectors, without information regarding what designated capacity is associated with what respective token collector; and (f) any combination of such information.

In various embodiments, at least one of the tokens in the selection game is associated with an award or award value and the award or award value associated with the at least one token includes: (a) a number of credits; (b) a number of free spins or activations; (c) a number of activations or plays of a bonus game; (d) a modifier such as a multiplier; (e) a physical prize having a value; (f a number of points; (g) causing one or more token collectors to instantly reach its designated capacity; (h) any combination of these; and (i) any other suitable award.

In various embodiments, instead of awards, at least one of the tokens in the selection game is associated with a symbol or event which may: (a) enable a player to cause the gaming system to eliminate a specific token (or value associated with that token) for a selected token collector; (b) enable a player to cause the gaming system to eliminate the most recent token (or value associated with that token) which was assigned to a selected token collector; (c) enable a player to cause the gaming system to eliminate all the tokens from a token collector; (d) enable a player to cause the gaming system to display the capacity of a selected token collector; (e) cause the gaming system to reveal a designated number of tokens which will be subsequently displayed to a player, (e double the value of an award associated with a designated token; (g) double the value of all of the awards associated with all of the tokens in a designated token collector; (h) cause one or more of the token collectors to instantly reach its designated capacity; (i) any combination of these; and (0) any other suitable symbol or event. In various embodiments, the gaming system requires a player to use or executes these events upon the display of the token associated with the respective event. In other embodiments, a player may store or bank these events for use later in a play of the selection game or a subsequent play of the selection game. It should be appreciated that tokens associated with any of the foregoing symbols or events may be utilized in any of the embodiments of the selection game disclosed herein. It should also be appreciated that in various embodiments, tokens associated with such features do not take up space in any token collector and thus do not cause any token collectors to reach their designated capacities.

It should be appreciated that although in the above examples, a player selects the token collector to which such features are applied, in various other embodiments, other suitable methods determine to which such features are applied (e.g., a random determination or round-robin).

It should be appreciated that in various embodiments, certain tokens result in a player receiving an award directly upon the display of the token collector independent of and/or in addition to the assignment of the token to a token collector.

In various other embodiments, players receive an award associated with each assignment of a token to a token collector independent of and/or in addition an award associated with any token collector reaching its designated capacity.

In various embodiments in which one or more tokens are associated with an award value, the value of awards associated with the tokens in the selection game may vary as a function of one or more players' wager on a play of the selection game.

In various embodiments, the gaming system enables the player to obtain tokens in addition to or instead of those provided to the player as in the foregoing specific embodiments. For example, in various embodiments, the gaming system at least one of: (a) enables one or more players to buy a designated number of tokens; (b) earn additional tokens, based on player tracking points or game play duration; and (c) receive additional tokens as a bonus during a play of the game. It should be appreciated that in various embodiments, not only may tokens associated with features as discussed above be stored for future use, but additionally, tokens which contribute to the designated capacity of one of the token collectors (in embodiments in which the designated capacity is a number of token collectors) may be stored for use later in a play of the game or in a subsequent play of the game.

In various embodiments, the manner in which token selectors are selected and the order in which players select token collectors in multi-player embodiments varies.

For instance, in various multi-player embodiments, an order in which players pick a token collector to assign displayed tokens to is established amongst the players. In one such embodiment, the order is displayed at the start of the multi-player selection game. In another embodiment, the order is revealed only at a time just prior to respective pick. In various embodiments, the order could be based upon play factors including, but not limited to: (a) player wagers; (b) player game results; (c) player loyalty point standing; (d) player physical position; (e) player order of bonus qualification; (f) prior bonus results; and (g) any other play factors. The order could also be a product of a random selection, or a uniformly random selection or a weighted random selection based upon play factors.

In one such embodiment, the gaming system enables the first player in the order to assign the first displayed token to a token collector; enables the second player in the redemption order to assign the second displayed token to a token collector, etc.

In another such embodiment, the gaming system enables the first player in the order to determine which player is to assign the first displayed token to a token collector; enables the second player in the order to determine which player is to assign the second displayed token to a token collector, etc.

In a further embodiment, the gaming system requires at least one player to select a designated token collector to assign a subsequently displayed token to at some specific point prior to the display of the token.

In other multi-player embodiments, participating players do not follow a predefined order for picking token collectors to assign respectively displayed tokens to.

In one such embodiment, the player which picks a token collector to assign a designated token to is determined based on a contest amongst the players.

In such embodiments various contests could be used to make such determination. In one embodiment, the contest is based upon a result of a slot game.

In another embodiment, the contest is based on a community video shooter game whereby each player has an independent shooting device. In one such embodiment, projectiles from a given shooting device will always connect with a token. In another such embodiment, the projectile from a given shooting device will only connect with a token if said shooting device is properly aimed or aligned and/or the shooting device control timing is correct. In another such embodiment, a push-projectile pushes a given token away from the shooting device. In another such embodiment, a pull-projectile pulls a given token towards the shooting device. In another embodiment, the best placed and/or most abundantly place projectiles will earn the corresponding player the pick ability.

It should be appreciated that in various such embodiments, once a player has selected a token to compete for, the player utilizes the provided projectiles to shoot at the token. It should be appreciated that in one such embodiment, there is no physical skill involved. That is, a player can only shoot at a token if a projectile will hit. However, the player strategically selects which tokens to shoot and, therefore, which award or awards to play for, based on any information about the token and the resources available to the player. Thus, selecting which of the tokens to shoot and pick a token collector for introduces an element of strategic skill to the game.

It should be appreciated that in various such embodiments, the number of projectiles provided to a player could be randomly determined, predetermined, determined based on player tracking, determined based on a players wager or determined in any other suitable manner.

It should be appreciated that in various embodiments in which players compete for the ability to place a token in a token collector by shooting projectiles, a variety of game themes may be employed to illustrate such projectiles. The gaming system could provide any suitable type of projectile, such as bullets, rockets, arrows, laser blasts, etc.

In other embodiments, rather than providing a number of projectiles to one or more players, the gaming system provides one or more players with a designated amount of energy or a designated amount of time for shooting. For example, the gaming system provides a player with a limited amount of total time, such as one minute, during which the player can shoot at tokens during a play of the game. In such embodiments, a player could use all of their time attempting to obtain the right to pick a token collector for a particular token, or could spread their shooting time amongst multiple tokens.

In certain embodiments, the gaming system enables one or more players to choose a type of projectile or, in some cases, which types of weapons the player wishes to use to shoot targets, thereby adding another element of strategy to the game. In one such embodiment, certain weapons may be associated with certain time constraints. For example, a given weapon may be more powerful (i.e., enable a player to obtain control of a token pick in a shorter amount of time or with fewer shots from that weapon), but it may require longer to reload than a less powerful weapon. In one embodiment, the player can earn or purchase upgrades which can be exchanged for better or more powerful projectiles and/or weapons.

In other embodiments, tokens may cascade down the display while one or more players shoot projectiles at the token. This introduces another dimension of complexity and excitement to the game in that players not only compete for shooting the token, but also all players are under a time constraint because once the token cascades to the bottom of the display, the token is no longer available.

It should be appreciated that such a cascading principle may be applied independent of a projectile-based competition themed game. Additionally, cascading tokens may be utilized in a single player or multi-player game. The use of cascading tokens speeds up game play and creates an extra element of excitement and enjoyment. For example, in a single player embodiment, instead of the gaming system displaying tokens statically as in the embodiment illustrated in the FIG. 3A to 3L, the token cascades down the display at a designated speed, requiring the player to select a token collector to assign each token to within a designated amount of time. It should be appreciated that in various other embodiments, multiple tokens may cascade down the display at the same time, requiring one or more players to both select which token to place in a token collector and select a token collector for that respective token.

In one embodiment, instead of players picking token collectors, at least one token collector is assigned to each player. In one such embodiment, although a given token collector is assigned to a specific player, any player can assign tokens to the token collector. A given player will win the award associated with the token collector assigned to said player. In one version of such embodiment, a given player will only win an award associated with the player's assigned token collector if said token collector has reached its designated capacity. In another version, a given player will win the award associated with the player's assigned token collector at the end of the multi-player selection game whether or not said token collector has reached or exceeded its designated capacity. In various such embodiments, the gaming device may or may not provide information to one or more players regarding which token collector is assigned to them prior to the end of the game.

In one embodiment, instead of having a player initially pick a token collector to assign a displayed token to, after the previous token's assignment has been resolved, the gaming system displays a subsequent token specifically over or in the vicinity of one the token collectors. If no action is taken (e.g., within a designated amount of time which may or may not be displayed to the player), this token will automatically be assigned to the token collector displayed immediately below it or in its vicinity. However, player action can change this. In one such embodiment, the gaming system enables a player to cause the token to be assigned to a different token collector. In another such embodiment, the gaming system enables a player to destroy (or not assign) a given token. Once a token is assigned or destroyed, yet another token is displayed directly over or in the vicinity of a token collector. In various such embodiments, the gaming system displays tokens directly over or in the vicinity of certain token collectors based on one or more of: (a) the location of a most recently filled token collector; (b) the location of a previous token collector over which a token was displayed; (c) a random determination; and (d) a predetermination.

In another embodiment, each player is assigned a specific number of token collector picks. After each of a plurality of tokens is displayed, the gaming system enables players with one or more picks remaining to signal when they wish to pick a token collector for a displayed token using at least one input device. When a respective token is displayed, a first player with any picks remaining signals. That player earns the right to select a token collector for the displayed token at the cost of a pick. In one embodiment, if two or more players signal for the same token, the player with the highest identified player factor (e.g., a weighted value associated with each player based on suitable criteria, such as gaming establishment award program points) is selected.

In another version, if two or more players signal for the same award, the player with the highest pick value is selected. For example, Player A's first pick will outrank Player B's second or subsequent pick. In another example, each player is assigned picks of different value, or weight, and the gaming system enables each player to decide which pick value, or weight, to use. In another embodiment, if two or more players signal for the same token, if the placement of the token in a token collector causes that token collector to reach or exceed its designated capacity, the players who signaled for that token split any award associated with that token collector reaching its designated capacity.

In another embodiment, instead of picking token collectors directly, each of the plurality of token collectors is associated with a player-selectable selection, each such selection being associated with a respective one of the token collectors. In various such embodiments, the gaming system does not display what token collector each respective player-selectable selection is associated with until after the player selects the player-selectable selection. In one such embodiment, each of the plurality of token collectors is associated with a color and each of a plurality of corresponding player-selectable selections is associated with a color (e.g., the player picks a colored selection, thereby picking a token collector associated with that color).

For example, during a play of the selection game, the gaming system displays a token. A player then selects one of a plurality of player-selectable selections, each of the plurality of player-selectable selections and each of the plurality of token collectors being associated with a color. At the time the player picks one of the player-selectable selections, the gaming system has not displayed the color associated with any of the selections. The gaming system places the displayed token in the token collector associated with the player-selectable selection picked by the player. It should be appreciated that in such embodiments, each player selectable selection need not be associated with a color, but may alternatively be associated with a number, a pattern, a shape, or any suitable identifier also associated with one of the plurality of token collectors.

As illustrated in the foregoing specific illustrations, in various embodiments of the selection game, an award is provided once at least one token collector reaches or exceeds its designated capacity. In various embodiments, the award may be determined in different ways. In various embodiments, the award may be: (a) associated with the tokens; and (b) associated with a token collector which has reached its designated capacity.

In embodiments in which the award is associated with the tokens, the award may be associated with the tokens in the sense that it includes a sum of award values associated with tokens placed in a token collector which has reached its designated capacity.

In embodiments in which the award is associated with the token collector which has reached its designated capacity, the award is independent of the tokens placed in the token collector (e.g., in embodiments where the designated capacity includes a total number of tokens or wherein each token is associated with a number of points and the designated capacity includes a total number of points and wherein the tokens are not associated with award values).

In certain embodiments, instead of one player receiving an award associated with a first token collector to reach its designated capacity as in the foregoing illustrated embodiment, one or more players share such award.

In one such embodiment, players are split into teams and when a first token collector reaches or exceeds its designated capacity, one; a plurality or each of the players on that team wins the award associated with the first token collector to reach or exceed its designated capacity. In one embodiment, the players on the team share the award associated with that token collector. In various alternative embodiments, the players share the award: (i) evenly amongst the players of the team; (ii) based on the relative number of picks spent by each player to fill the token collector (i.e., the relative contribution of each player); (iii) based on the amount wagered by each player; (iv) based on player tracking; (v) based on any other suitable criteria; and (vi) any combination of these.

In another variation, the selection of which player is to receive an award associated with a token collector which has reached or exceeded its designated capacity is independent of which player's selection caused the token collector to reach its designated capacity.

In various embodiments, certain token collectors are associated with hidden awards or executable game events at the beginning of a play of the selection game which the gaming device does not display to the one or more players playing the selection game at the beginning of play of the selection game.

In various embodiments, the gaming system determines which token collectors one or more of the above features is applicable to in a variety of manners including, but not limited to: (a) randomly; (b) in a predetermined manner; (c) round-robin; and (d) any other suitable manner.

In various embodiments, one or more players may bank such features for later use during a play of the selection game or for a subsequent play of the selection game.

In various embodiments, the gaming system enables players to place a side bet on which token collector will reach its designated capacity first. In various other embodiments in which the game does not end when a first token collector reaches its designated capacity, the gaming system enables players to further wager on the order in which token collectors reach their designated capacity.

In various embodiments, the selection game may be part of a central determination system platform. In one such embodiment, after a token collector reaches its designated capacity, the gaming system determines both if a player is entitled to an award and whether that award has been previously provided to a player. If the award has not been previously provided to a player, the gaming system provides the award to the player. If the award has been previously provided to a player, the gaming system modifies the award in a suitable manner. In such embodiments, since an award may be modified before being provided to a player, the gaming system does not display an award which will be provided to a player until the award has been determined in accordance with the central determination system.

In various multi-player embodiments of the selection game, players may begin and exit play of the selection game in a variety of different manners. In various embodiments in which the selection game is a multi-player bonus game, players may begin play of the game or bonus round at the same time. In other embodiments, a multi-player bonus selection game may be triggered based on one or more of: (a) an outcome of a game on at least one gaming device of a bank of gaming devices; (b) the total wagers placed since the last bonus game; (c) a certain period of time elapsing since the last bonus game; (d) a "lucky coin" bonus initiation in which every coin wagered is actually an independent random check for the bonus game; and (e) a "lucky coin" bonus initiation in which every coin wagered is a random draw from a fixed pool of tickets of which a fixed number of tickets trigger the bonus game, and as tickets pulled out of the pool are not replaced, the bonus game becomes inevitable if players keep playing.

In another embodiment, for wide-area networked gaming devices including Internet-based network gaming, all of a plurality of networked players who have qualified for a multi-player bonus selection game within a certain period of time participate in a networked bonus game event.

In one multi-player embodiment, the first player to cause a given token collector to reach or exceed its designated capacity wins an award associated with that token collector and retires from the multi-player selection game, leaving the remaining players to continue playing under the same conditions as when the first player exited the multi-player selection game. In other words, the next player to cause another token collector to reach or exceed its designated capacity wins an award associated with that token collector and retires from the bonus round. This could continue for a designated number of players, until the last player has caused a token collector to reach or exceed its designated capacity or until a last token collector has reached or exceeded its designated capacity.

In one such embodiment, there are more token collectors than players, meaning that all players will cause a token collector to reach or exceed its designated capacity, but not all token collectors will reach their designated capacity. In another variation, there are fewer token collectors than players, meaning that all token collectors will reach their designated capacity, but not all players will cause a token collector to reach or exceed its designated capacity. In another variation, there are an equal number of players and token collectors, meaning that the last player in the bonus round will cause the last token collector which has not yet reached its designated capacity to reach its designated capacity.

In another embodiment, as players cause token collectors to reach their designated capacities, these players are allowed to keep playing the bonus round. This means that each player may win the awards for one of, a plurality of, or all of the token collectors in the bonus round. In this embodiment, the bonus ends when all token collectors have reached their designated capacities. In this embodiment, even if there are more token collectors than players, each player would not be guaranteed to win the awards of at least one token collector, since some players may win the awards of multiple token collectors.

In another embodiment, as players cause token collectors to reach their designated capacities, these players are allowed to keep playing the bonus round. In this embodiment, the players' awards are not based on the values of the tokens, but rather on the number of token collectors each player causes to reach their capacity. In one such embodiment, a player who causes the most token collectors to reach their designated capacity may receive a special award. In other such embodiments, specific awards are associated with certain numbers of token collectors being caused to reach their respective designated capacities (e.g., 1, 2, 3 or n). In such embodiments, players who cause the same number of token collectors to reach their designated capacity may win the same award, or may split the respective award evenly among them.

In another embodiment, players continue to add tokens to token collectors until a particular terminating token collector has reached its capacity. This means that all players may continue to cause all of the other token collectors to reach their designated capacities without ending the bonus game. However, the identity of the terminating token collector is secret from all of the players. Once the terminating token collector has reached its designated capacity, its identity is revealed and the bonus game is terminated. Players win all the awards associated with the token collectors they caused to reach their designated capacity.

In another embodiment, the selection game is triggered once a minimum number ("N") players are eligible to or wish to play. In this embodiment, the game ends when "K" number of players have caused a token collector to reach its designated capacity, where "K" is greater than or equal to one and less than "N." Thus, in such an embodiment, at least one player will not receive an award associated with causing a token collector to reach its designated capacity.

In another embodiment, players play the selection game in a tournament format, wherein players receive points for causing token collectors to reach their designated capacity and other suitable game events. In such embodiments, players may receive prizes for having a largest number of points.

In various embodiments, players may receive a bonus award if tokens are placed in a token collector in a particular order or sequence. In other such embodiments, the order or sequence of tokens placed in one or more token collectors is the basis for one or more base awards.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:
at least one input device;
at least one display device;
at least one processor; and
at least one memory device storing a plurality of instructions, which when executed by the at least one processor, cause the at least one processor to operate with the at least one input device and the at least one display device to, for a play of a game:
(i) display a plurality of token collectors, each of the plurality of token collectors having a designated capacity;
(ii) display a token;
(iii) without displaying the designated capacity of at least one of the token collectors, enable a player to assign the displayed token to any one of the token collectors;
(iv) place said token in said one of the token collectors;
(v) determine if any of the token collectors has reached its designated capacity;
(vi) if one of the token collectors has reached its designated capacity, display and provide an award to the player; and
(vii) if none of the token collectors has reached its designated capacity, display another token and repeat (iii) to (vii).

2. The gaming system of claim 1, wherein each of the tokens is associated with one or more of: (a) an award and (b) a number of points.

3. The gaming system of claim 2, wherein the designated capacity of at least one of the token collectors is selected from the group consisting of: (a) a sum of a plurality of award values; (b) a total number of tokens; and (c) a total number of points.

4. The gaming system of claim 1, wherein the award is associated with the tokens.

5. The gaming system of claim 1, wherein the award is associated with the token collector which has reached its designated capacity.

6. The gaming system of claim 4, wherein the designated capacity of each of the token collectors includes a total award equal to a sum of award values associated with the tokens placed in said token collector.

7. The gaming system of claim 4, wherein the award is associated with at least one of the tokens and includes an award selected from the group consisting of: (a) a number of credits; (b) a number of free spins or activations; (c) a number of activations or plays of a bonus game; (d) a modifier such as a multiplier; and (e) a physical prize having a value.

8. The gaming system of claim 1, wherein the plurality of instructions, when executed by the at least one processor, cause the at least one processor to operate with the at least one input device and the at least one display device to require the player to select one of the token collectors to assign each token to within a designated amount of time.

9. The gaming system of claim 1, wherein the designated capacities of each of one or more of the token collectors will not be reached during said play of the game.

10. The gaming system of claim 1, wherein the plurality of instructions, when executed by the at least one processor, cause the at least one processor to associate certain tokens with features which cause the gaming system to perform a function selected from the group consisting of: (a) eliminating a specific value associated with a token previously placed in one of the token collectors from said token collector; (b) eliminating a value associated with a token which was most recently placed in one of the token collectors; (c) eliminating all values associated with tokens previously placed in a designated one of the token collectors; (d) displaying the designated capacities of one or more of the token collectors; (e) displaying the next "N" tokens which will be displayed by the gaming system; (f) modifying a value of an award associated with one or more designated tokens; and (g) modifying a value of a total award associated with each of one or more of the token collectors.

11. The gaming system of claim 10, wherein the plurality of instructions, when executed by the at least one processor, cause the at least one processor to operate with the at least one input device and the at least one display device to enable the player to save such features for later use.

12. A gaming system comprising:

at least one input device;

at least one display device;

at least one processor; and at least one memory device storing a plurality of instructions, which when executed by the at least one processor, cause the at least one processor to operate with the at least one input device and the at least one display device to for a play of a game:

(a) display a plurality of token collectors, each of the token collectors having a designated capacity;

(b) display a plurality of tokens, each of the tokens being assignable to one of the token collectors;

(c) without displaying the designated capacity of at least one of the plurality of token collectors, for each of the tokens:

(i) enable one of a plurality of players to assign said token to any one of the token collectors;

(ii) place said token in said one of the token collectors; and (iii) determine if any of the token collectors has reached its designated capacity; and (d) if one of the token collectors has reached its designated capacity, display and provide an award to one of the players.

13. The gaming system of claim 12, wherein each of the tokens is associated with one or more of: (a) an award and (b) a number of points.

14. The gaming system of claim 12, wherein the designated capacity of at least one of the token collectors is selected from the group consisting of: (a) a sum of a plurality of award values; (b) a total number of tokens; and (c) a total number of points.

15. The gaming system of claim 12, wherein the award is associated with the tokens.

16. The gaming system of claim 12, wherein the award is associated with the token collector which has reached its designated capacity.

17. The gaming system of claim 12, wherein the plurality of instructions, when executed by the at least one processor, cause the at least one processor to operate with the at least one input device and the at least one display device to provide the award associated with the token collector which has reached its designated capacity to the player that causes the token collector to reach its designated capacity.

18. The gaming system of claim 12, wherein the plurality of instructions, when executed by the at least one processor, cause the at least one processor to operate with the at least one input device and the at least one display device to provide the award associated with the token collector which has reached its designated capacity in a shared manner among a group of the players.

19. The gaming system of claim 18, wherein the plurality of instructions, when executed by the at least one processor, cause the at least one processor to allocate and provide the award in a manner selected from the group consisting of: (a) evenly amongst the group; (b) based on a relative number of picks used by each of the players in the group to fill the token collector; (c) based on an amount wagered by each of the players in the group; and (e) based on player tracking.

20. The gaming system of claim 12, wherein the game is a bonus round, and a first one of the players to cause one of the token collectors to reach its designated capacity retires from the bonus round, leaving the remaining players to continue playing the bonus round.

21. The gaming system of claim 20, wherein there are more token collectors than there are players.

22. The gaming system of claim 20, wherein there are fewer token collectors than there are players.

23. The gaming system of claim 20, wherein there is an equal number of token collectors and players.

24. The gaming system of claim 20, wherein the plurality of instructions, when executed by the at least one processor, cause the at least one processor to assign a designated one of the token collectors to each of the players.

25. The gaming system of claim 20, wherein the plurality of instructions, when executed by the at least one processor, cause the at least one processor to operate with the at least one input device and the at least one display device to enable the players to pick which of the token collectors to assign one or more of the tokens to according to an order.

26. The gaming system of claim 12, wherein the plurality of instructions, when executed by the at least one processor, cause the at least one processor to operate with the at least one input device and the at least one display device to enable the players to pick which of the token collectors to assign one or more of the tokens to according to a result of a competition.

27. The gaming system of claim 12, wherein after one of the tokens has previously been assigned to one of the token collectors, the plurality of instructions, when executed by the at least one processor, cause the at least one processor to operate with the at least one input device and the at least one display device to subsequently display one of the tokens in close proximity to one of the token collectors and automatically assign the subsequently displayed one of the tokens to said one of the token collectors unless one of the players causes the subsequently displayed one of the token to be assigned to a different one of the token collectors.

28. The gaming system of claim 12, wherein the game is a persistence type selection game.

29. The gaming system of claim 28, wherein the plurality of instructions, when executed by the at least one processor, cause the at least one processor to operate with the at least one input device and the at least one display device to display the tokens as part of a play of a primary game, wherein the players assign the tokens to the token collectors in the persistence type selection game.

30. The gaming system of claim 29, wherein the plurality of instructions, when executed by the at least one processor, cause the at least one processor to operate with the at least one input device and the at least one display device to enable one of the players to store one or more of the tokens for later use in the persistence type selection game.

31. The gaming system of claim 29, wherein the plurality of instructions, when executed by the at least one processor, cause the at least one processor to operate with the at least one input device and the at least one display device to instruct the players to use the tokens from the primary game in the persistence type selection game as the tokens are displayed in the primary game.

32. The gaming system of claim 28, wherein the plurality of instructions, when executed by the at least one processor, cause the at least one processor to operate with the at least one input device and the at least one display device to enable the players to enter the persistence type selection game in a manner selected from the group consisting of: (a) at designated time intervals; (b) as a bonus award associated with a play of another game; and (c) by placing a wager of a designated number of credits.

33. The gaming system of claim 13, wherein the designated capacity of each of the token collectors includes a total award equal to the sum of a plurality of award values.

34. The gaming system of claim 13, wherein the award is associated with at least one of the tokens and includes an award selected from the group consisting of: (a) a number of credits; (b) a number of free spins or activations; (c) a number of activations or plays of a bonus game; (d) a modifier such as a multiplier; and (e) a physical prize having a value.

35. The gaming system of claim 12, wherein the plurality of instructions, when executed by the at least one processor, cause the at least one processor to operate with the at least one input device and the at least one display device to, for each of the tokens, require one of the players to select one of the token collectors to assign said token to within a designated amount of time.

36. The gaming system of claim 12, wherein the designated capacity of each of one or more of the token collectors will not be reached during said play of the game.

37. The gaming system of claim 12, wherein the plurality of instructions, when executed by the at least one processor, cause the at least one processor to associate certain of the tokens with features which cause the gaming system to perform a function selected from the group consisting of: (a) eliminating a specific value associated with one of the tokens previously placed in one of the token collectors from said token collector; (b) eliminating a value associated with one of the tokens which was most recently placed in one of the token collectors; (c) eliminating all values associated with the tokens previously placed in a designated one of the token collectors; (d) displaying the designated capacities of one or more of the token collectors; (e) displaying the next "N" tokens which will be displayed by the gaming system; (f) modifying a value of an award associated with one or more of the tokens; and (g) modifying a value of a total award associated with each of one or more of the token collectors.

38. The gaming system of claim 37, wherein the plurality of instructions, when executed by the at least one processor, cause the at least one processor to operate with the at least one input device and the at least one display device to enable one of the players to save such features for later use.

* * * * *

UNITED STATES PATENT AND TRADEMARK OFFICE

CERTIFICATE OF CORRECTION

PATENT NO. : 8,210,935 B2
APPLICATION NO. : 12/269238
DATED : July 3, 2012
INVENTOR(S) : Scott A. Caputo et al.

It is certified that error appears in the above-identified patent and that said Letters Patent is hereby corrected as shown below:

IN THE CLAIMS

In Column 35, Claim 12, Line 20, after “to” insert --,--.
In Column 37, Claim 33, Line 7, replace “13” with --12--.
In Column 37, Claim 33, Line 9, replace “the sum” with --a sum--.
In Column 37, Claim 34, Line 10, replace “13” with --12--.

Signed and Sealed this
Eighth Day of January, 2013

David J. Kappos
*Director of the United States Patent and Trademark Office*